(12) United States Patent
Imai

(10) Patent No.: US 7,301,872 B2
(45) Date of Patent: Nov. 27, 2007

(54) OPTICAL PICKUP AND OPTICAL DISC DRIVE DEVICE

(75) Inventor: Satoshi Imai, Tokyo (JP)

(73) Assignee: Sony Corporation (JP)

( * ) Notice: Subject to any disclaimer, the term of this patent is extended or adjusted under 35 U.S.C. 154(b) by 688 days.

(21) Appl. No.: 10/481,825

(22) PCT Filed: Mar. 28, 2002

(86) PCT No.: PCT/JP02/03092

§ 371 (c)(1),
(2), (4) Date: Dec. 23, 2003

(87) PCT Pub. No.: WO02/080157

PCT Pub. Date: Oct. 10, 2002

(65) Prior Publication Data

US 2004/0246853 A1    Dec. 9, 2004

(30) Foreign Application Priority Data

Mar. 30, 2001 (JP) .............................. 2001-098583

(51) Int. Cl.
*G11B 7/135* (2006.01)
(52) U.S. Cl. ................. 369/53.19; 369/44.23; 369/44.32
(58) Field of Classification Search ............. 369/53.19, 369/44.14, 44.29, 112.01, 112.08, 112.2, 369/43.2, 112.05, 112.29, 120, 44.23, 44.32, 369/112.1

See application file for complete search history.

(56) References Cited

U.S. PATENT DOCUMENTS 5,703,856 A * 12/1997 Hayashi et al. ............ 369/53.2

6,404,721 B1 * 6/2002 Asoma ................... 369/112.01
6,480,456 B1 * 11/2002 Kawamura et al. ......... 369/120
6,490,100 B1 * 12/2002 Sasano et al. ........... 369/112.2

(Continued)

FOREIGN PATENT DOCUMENTS

JP          1-269244 A       10/1989

(Continued)

OTHER PUBLICATIONS

International Search Report dated Jun. 18, 2002.

*Primary Examiner*—Andrea Wellington
*Assistant Examiner*—Kim-Kwok Chu
(74) *Attorney, Agent, or Firm*—Rader Fishman & Grauer PLLC; Ronald P. Kananen

(57) ABSTRACT

The present invention relates to an optical pickup and an optical disc drive that records or reproduces data signals on or from optical discs different in specifications, such as recording density and thickness. One objective lens (17) is used for optical discs (22a, 22b) of two types that differ in specifications. The optical pickup and the optical disc drive comprise two light source sections (24a, 24b) and a lens-supporting mechanism (15). The light source sections emit two laser beams of different wavelengths, respectively. The lens-supporting mechanism (15) controls the position of the objective lens (17) in the radial direction of the discs and along the optical axis. The lens-supporting mechanism (15) has a lens-inclination adjusting mechanism (30) capable of changing an angle at which the objective lens (17) is inclined to the optical axis, substantially in proportion to a displacement of the optical disc of the first type from the reference point in the signal-recording plane of the optical disc of the first type.

9 Claims, 15 Drawing Sheets

U.S. PATENT DOCUMENTS

| | | | |
|---|---|---|---|
| 6,496,453 B2 * | 12/2002 | Asada et al. | 369/44.23 |
| 6,671,247 B1 * | 12/2003 | Arai et al. | 369/112.01 |
| 6,760,296 B1 * | 7/2004 | Baba et al. | 369/112.05 |
| 6,816,450 B2 * | 11/2004 | Miura et al. | 369/112.29 |
| 6,836,452 B2 * | 12/2004 | Matsuda | 369/44.14 |

FOREIGN PATENT DOCUMENTS

| | | |
|---|---|---|
| JP | 06-215406 | 8/1994 |
| JP | 11-110802 | 4/1999 |
| JP | 2000-036125 | 2/2000 |
| JP | 2001-43554 A | 2/2001 |
| JP | 2001-93178 A | 4/2001 |
| JP | 2001-148136 A | 5/2001 |
| JP | 2001-319353 A | 11/2001 |

* cited by examiner

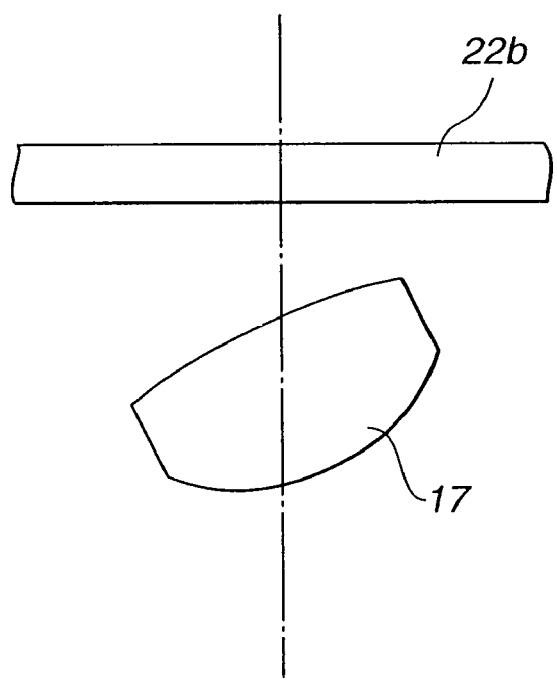 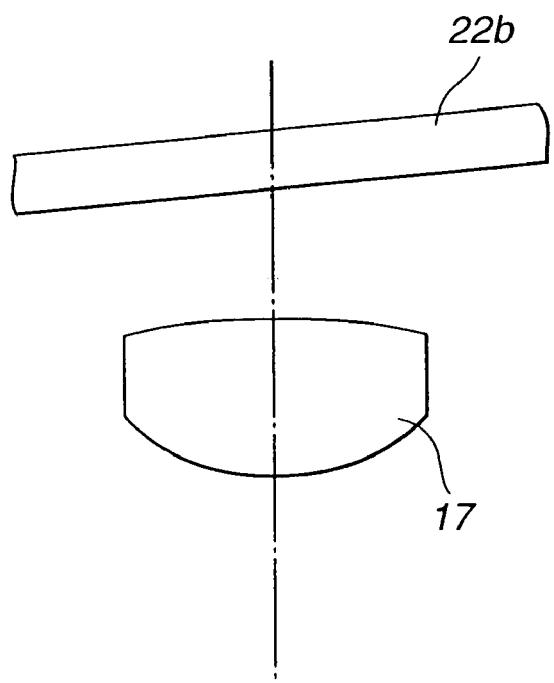
FIG.12A  FIG.12B

OPTICAL PICKUP AND OPTICAL DISC DRIVE DEVICE

TECHNICAL FIELD

The present invention relates to an optical pickup that can record or reproduce data signals on or from optical discs of different specifications. The invention also relates to an optical disc drive that comprises the optical pickup.

BACKGROUND ART

Optical disc drives are known, which apply a laser beam to optical discs, i.e., disc-shaped optical recording media, thereby to record data signals on the optical discs or reproduce data signals from the optical discs. Some of the optical disc drives incorporate one optical pickup that can record or reproduce data signals on or from optical discs that differ in specification such as thickness, recording density and the like.

FIG. 1 shows an optical pickup configured to record data signals on optical discs of different specifications or to reproduce data signals recorded on optical discs. As FIG. 1 depicts, an optical pickup 101 has two semiconductor lasers 102 and 103, two beam splitters 104 and 105, a collimator lens 106, an objective lens 107, a lens-supporting mechanism h, a light-receiving element 109, and the like. The semiconductor lasers 102 and 103 are laser beam emitting elements that emit laser beams different in wavelength. The lens-supporting mechanism h includes an actuator that drives and displaces the objective lens 107. The light-receiving element 109 receives the light beam reflected from an optical disc 110.

Various methods are available of enhancing the density at which data signals on optical discs are recorded. Of these methods, the most generally used is to use an objective lens having a large numerical aperture (NA) and apply a light beam having a short wavelength ($\lambda$) to read data signals recorded on the optical disc. If the recording medium used is a compact disc (CD), an optical pickup is used that comprises an objective lens having a numerical aperture (NA) of 0.45 and emits a light beam having a wavelength ($\lambda$) of 780 nm. If the recording medium is a digital versatile disc (DVD), there is used an optical pickup that comprises an objective lens having a numerical aperture (NA) of 0.6 and emits a light beam having a wavelength ($\lambda$) of 650 nm. Note that the diameter of a beam spot formed on the signal-recording plane of the optical disc is proportional to $\lambda/NA$. Hence, the beam spot formed on any DVD has a diameter that is about 63% of the diameter of the beam spot formed on the CD.

The larger the numerical aperture (NA) of the objective lens, the more greatly the beam spot will be deformed when the optical disc is inclined to the light beam. More specifically, the beam spot will be more deformed as the coma-aberration increases in proportion to the cube of NA. Thus, the protective layer of the DVD is made thinner than that of the CD so as to reduce the beam-spot deforming caused by the inclination of the optical disc to the light beam.

In order to record or reproduce data signals on or from two types of optical discs, e.g., a CD and a DVD, by one objective lens, the light beam must be focused to form a beam spot of such a size as would record or reproduce data signals as is desired. Such an objective lens is described in, for example, the specification of Japanese Patent No. 2559006.

The CD and the DVD are almost identical in terms of diameter and thickness. However, the protective layer of the DVD is thinner than that of the CD, as pointed out above. The CD and the DVD inevitably differ in the position of the signal-recording plane. Due to this difference, the CD and the DVD are regarded as a thick disc and a thin disc, respectively.

Being thin, optical discs may warp in their radial direction, from the center to the outer circumference. Consequently, so-called "plane wobbling" is likely to occur as any optical disc is rotated. The warping and/or plane wobbling of the optical disc results in a coma-aberration. The coma-aberration gives rise to crosstalk, because the beam spot formed on the disc is deformed. The crosstalk renders unclear signals read from the disc. To minimize the deforming of the beam spot, various methods can be employed. One method is to detect the inclination of the optical disc electrically and to reduce the aberration by an aberration-correcting element in accordance with the disc inclination detected, as is disclosed in Jpn. Pat. Appln. Laid-Open Publication No. 11-110802. Another method is to use a triaxial actuator that can move the objective lens in three directions, i.e., focusing direction, tracking direction and tilting direction, as is disclosed in Jpn. Pat. Appln. Laid-Open Publication No. 2000-36125. These methods described in the Laid-Open publications, i.e., methods of minimizing the deforming of the beam spot formed on the optical disc, require additional components. The additional components render the optical pickup complicated in structure and raise the manufacturing cost of the optical pickup. Ultimately, they will increase the structural complexity and manufacturing cost of the optical disc drive that uses this optical pickup.

A method of preventing the deforming of a beam spot has been proposed. In the method, a two-axis actuator is inclined to the radial direction of the optical disc, in proportion to the displacement of the objective lens from a prescribed position. That is, the actuator is moved to follow the warping of the optical disc, thereby to prevent the deforming of the beam spot. To record or reproduce data signals on or from two types of optical discs that are different in thickness, by means of a single objective lens, it is necessary to adjust the working distance, i.e., the distance between the objective lens and the incidence side of the optical disc. When the same support supports either type of an optical disc and the inclination of the objective lens is set for one type of an optical disc, the objective lens is inclined to the other type of an optical lens by the angle proportional to the difference between the two types of discs in terms of working distance. Inevitably, the optical pickup reproduces degraded data signals.

DISCLOSURE OF THE INVENTION

An object of this invention is to provide a novel optical pickup that can solve the above-mentioned problems with the conventional optical pickup and conventional optical disc drive, and to provide an optical disc drive that comprises this novel optical pickup.

Another object of the invention is to provide an optical pickup that has a simple structure and can yet prevent the deforming of the beam spot formed as a light beam is applied to an optical disc, thereby to record or reproduce data signals on or from the optical disc, with good recording/reproducing characteristics, and to provide an optical disc drive that comprises this optical pickup.

According to this invention made to achieve the objects specified above, an optical pickup is provided designed to record or reproduce data signals on or from two types of optical discs that differ in at least data recording density and thickness, by using the same objective lens. The optical pickup comprises: two light source sections for emitting laser beams having different wavelengths; and a lens-supporting mechanism for controlling a position of the objective lens in a radial direction of the optical discs and along an optical axis. The lens-supporting mechanism has a lens-inclination adjusting mechanism capable of changing an angle at which the objective lens is inclined to the optical axis, substantially in proportion to a displacement of the optical disc of the first type. The second light source section for recording or reproducing data signals on or from the optical disc of the second type is positioned with respect to the position of the first light source section for recording or reproducing data signals on or from the optical disc of the first type, so as to satisfy the following condition:

$$120° \leq \theta \leq 240°$$

where $\theta$ is an angle measured counterclockwise from the first light source section used to record or reproduce data signals on or from the optical disc of the first type to the second light source section used to record or reproduce data signals on or from the optical disc of the second type, along a straight line in which the optical pickup moves toward an outer circumference of the optical disc to record or reproduce data signals on or form the optical disc. The optical pickup eliminates the deterioration of the beam spot, which results from the warping of the optical disc of the first type. Additionally, it can minimize the influence imposed on the optical disc of the second type by the objective lens inclined by the lens-inclination adjusting mechanism.

The present invention also provides an optical disc drive apparatus designed to record or reproduce data signals on or from two types of optical discs that differ in specifications such as data recording density, thickness and the like, by using the same objective lens. The optical pickup comprises: two light source sections for emitting laser beams having different wavelengths, and a lens-supporting mechanism for controlling a position of the objective lens in a radial direction of the optical discs and along an optical axis. The lens-supporting mechanism has a lens-inclination adjusting mechanism capable of changing an angle at which the objective lens is inclined to the optical axis, substantially in proportion to a displacement of the optical disc of the first type from a reference point in a signal-recording plane of the optical disc of the first type. The second light source section for recording or reproducing data signals on or from the optical disc of the second type is positioned with respect to the position of the first light source section for recording or reproducing data signals on or from the optical disc of the first type, so as to satisfy the following condition:

$$120° \leq \theta \leq 240°$$

where $\theta$ is an angle measured counterclockwise from the first light source section used to record or reproduce data signals on or from the optical disc of the first type to the second light source section used to record or reproduce data signals on or from the optical disc of the second type, along a straight line in which the optical pickup moves toward an outer circumference of the optical disc to record or reproduce data signals on or from the optical disc. The optical disc drive apparatus can eliminate the deterioration of the beam spot, which results from the warping of the optical disc of the first type, thereby to optimize the data signals recorded or reproduced. Further, the apparatus can minimize the influence imposed on the optical disc of the second type by the objective lens inclined by the lens-inclination adjusting mechanism.

In the optical pickup and the optical disc drive apparatus, both according to this invention, two light source sections are supported on the same support member. Therefore, the pickup and the apparatus can be rendered compact as a whole.

In the optical pickup and the optical disc drive apparatus, both according to this invention, the lens-inclination adjusting mechanism is configured to change the angle at which the objective lens is inclined, to satisfy the following condition:

$$1/4 \cdot \delta/R \leq S \leq \delta/R$$

where S is the inclination angle of the objective lens (regarded as positive if the objective lens approaches the outer circumference of the optical disc of the first type), $\delta$ is the displacement of the objective lens from a reference position (regarded as positive if the objective lens approaches the optical disc), and R is the radius of the optical disc. Thanks to this configuration, it is possible to eliminate the deterioration of the beam spot efficiently, which results from the warping of the optical disc of the first type.

The optical pickup and the optical disc drive apparatus, both according to this invention, further comprise a light-receiving section for receiving laser beams reflected by the optical discs, and means arranged between the light-receiving section and the objective lens. Said means combines optical paths of two types of laser beams emitted from the two light sources, respectively, such that the two laser beams reflected by the optical discs are received at substantially the same point on the light-receiving section. Hence, the light-receiving section works for two types of optical discs. This helps to reduce the number of components.

Further, the optical pickup and the optical disc drive apparatus, according to this invention, satisfy the following conditions:

where f is the focal distance of the objective lens; $\beta$ is the magnification of the optical system; $\Delta WD$ is the difference between the working distance of recording or reproducing data signals on or from the optical disc of the first type and the working distance of recording or reproducing data signals on or from the optical disc of the second type; $\emptyset$ is the angle at which the optical disc of the second type is inclined to record or reproduce the signals in optimal conditions when the incidence angle of the laser beam applied to the objective lens changes by one degree; $\alpha$ is the angle at which the optical disc of the second type is inclined to optimize the signals recorded or reproduced, when the incidence angle of the laser beam applied to the objective lens changes by the one degree (regarded as positive if the disc is inclined to eliminate the influence of inclination of the laser beam); T is the proportionality constant determined by the radius of the optical disc of the first type, which relates the displacement of the objective lens (regarded as positive if the objective lens approaches the optical disc of the first type) from a reference position and the inclination of the objective lens (regarded as positive if the side of the objective lens located at the outer circumference of the optical disc of the first type approaches the optical disc of the first type); $\Delta L$ is the distance between the first light source section used to record or reproduce data signals on or from the optical disc of the first type and the second light source section used to record or reproduce data signals on or from the optical disc of the second type; and θ is an angle measured counterclockwise from the first light source section to the second light source section, along a straight line in which the optical pickup moves toward an outer circumference of the optical disc to record or reproduce data signals on or form the optical disc. Hence, this optical pickup can effectively reduces the influence, such as coma-aberration, imposed on the optical disc of the second type, too, by the objective lens inclined by the lens-inclination adjusting mechanism.

The other objects of this invention and the other advantages achieved by the invention will be apparent from the embodiments that shall be described below, with reference to the accompanying drawings.

BRIEF DESCRIPTION OF THE DRAWINGS

FIG. 12A is a diagram showing how coma-aberration occurs when the objective lens inclines to the optical disc;

FIG. 12B is a diagram explaining how coma-aberration occurs when the optical disc inclines to the objective lens;

BEST MODE FOR CARRYING OUT THE INVENTION

An optical pickup according to the invention and an optical disc drive comprising the optical pickup of the invention will be described, with reference to the accompanying drawings.

The embodiments described below are an optical disc drive that uses, as recording medium, a DVD (Digital Versatile Disc or Digital Video Disc, hereinafter referred to as "DVD") or a CD (Compact Disc, hereinafter referred to as "CD") such as CD-ROM, CD-R, CD-RW or the like, and an optical pickup that is incorporated in this optical disc drive.

The optical disc drive according to the invention will be first described.

Figure 1:
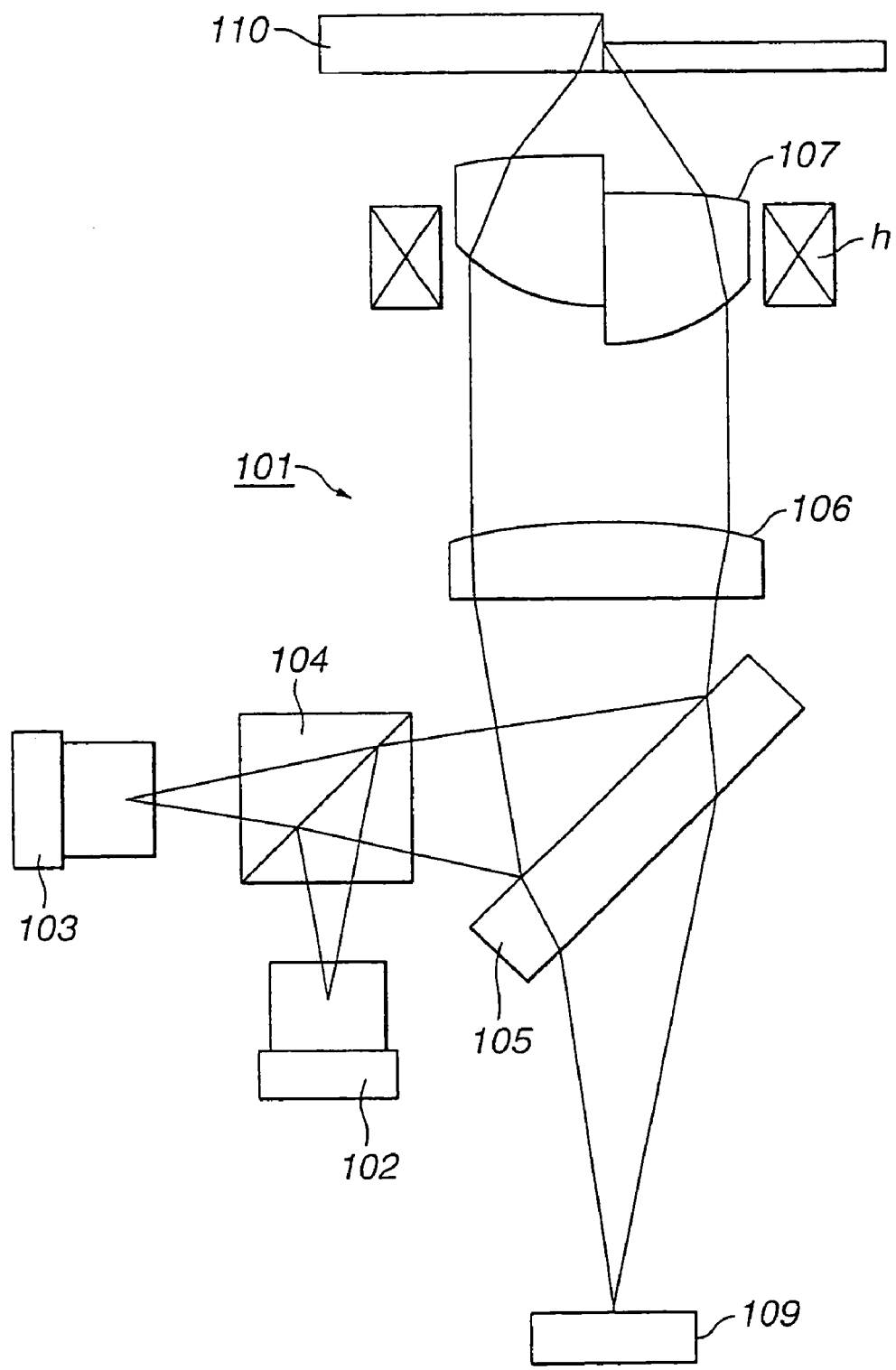
FIG. 1 is a side view of a conventional optical system of the optical pickup, depicting the basic structure of the optical pickup.
Figure 2:
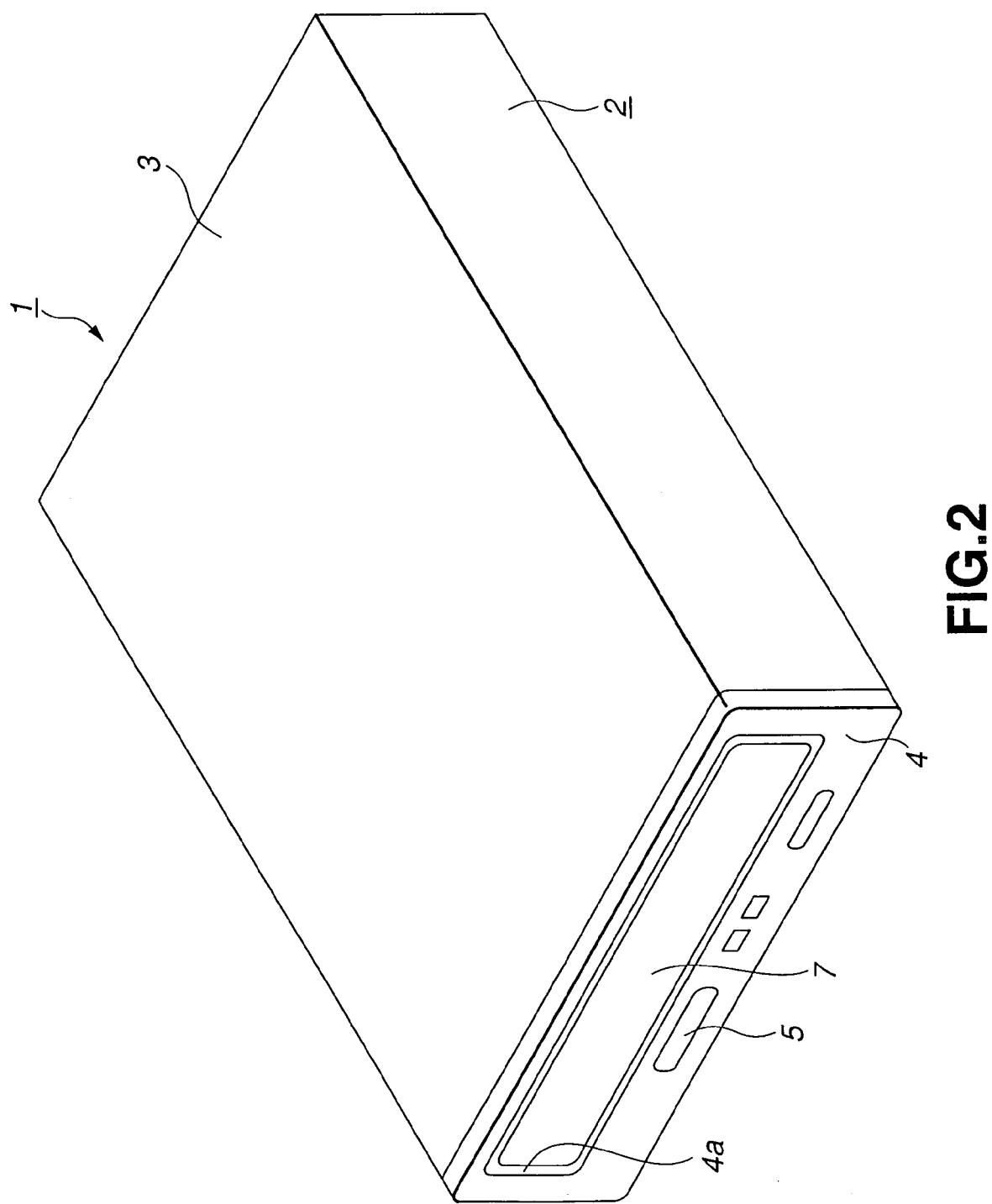
FIG. 2 is a perspective view, illustrating the outer appearance of an optical disc drive according to the invention.

As FIG. 2 shows, the optical disc drive 1 has a housing 2 and various components and mechanisms contained in the housing 2. The housing 2 comprises a cover 3 and a front panel 4. The front panel 4 has an elongate opening 4a and an operation section 5. The opening 4a extends horizontally. The operation section 5 has various operation buttons.

Figure 3:
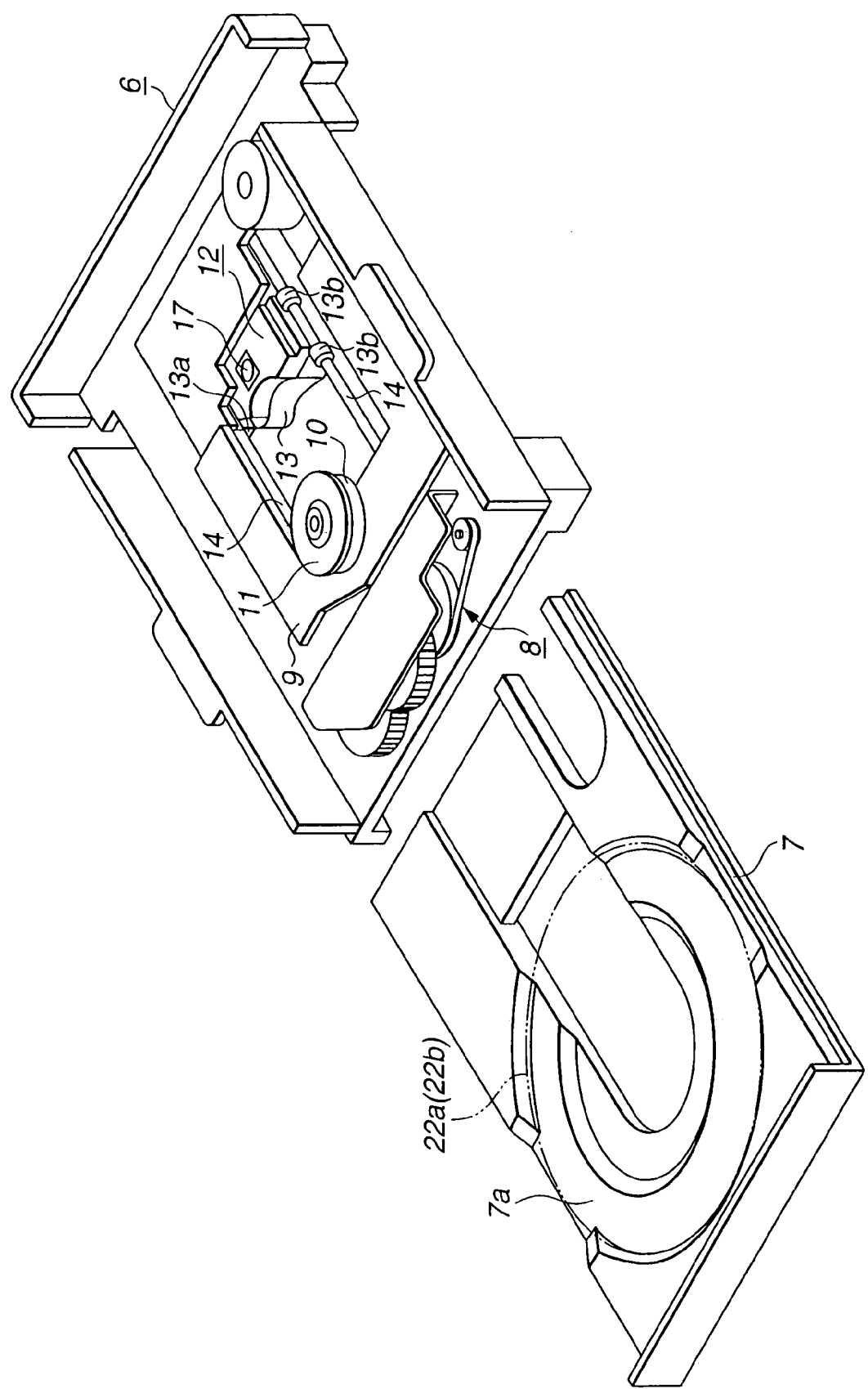
FIG. 3 is a partly exploded, perspective view of the optical disc drive, showing the basic structure thereof.

As FIG. 3 depicts, the housing 2 contains a mechanism frame 6. The mechanism frame 6 supports various mechanisms. Among the mechanisms are a loading mechanism 8 that loads a disc tray 7 and a base unit 9 that can rotate. The base unit 9 holds a disc table 11 and an optical pickup 12. The disc table 11 can be rotated by a spindle motor 10. The optical pickup 12 is supported by the base unit 9, and is able to move in the radial direction of an optical disc that is mounted on the disc table 11 and can be rotated.

As shown in FIG. 3, the optical pickup 12 comprises a movable base 13 and some other parts arranged on the movable base 13. More precisely, two bearing units 13a and 13b are provided at the ends of the movable base 13, respectively. The bearing units 13a and 13b support two guide shafts 14, respectively. The guide shafts 14 extend parallel to each other. Guided by these shafts 14, the optical pickup 12 can move in the axial direction of the spinning optical disc mounted on the disc table 11.

Figure 4:
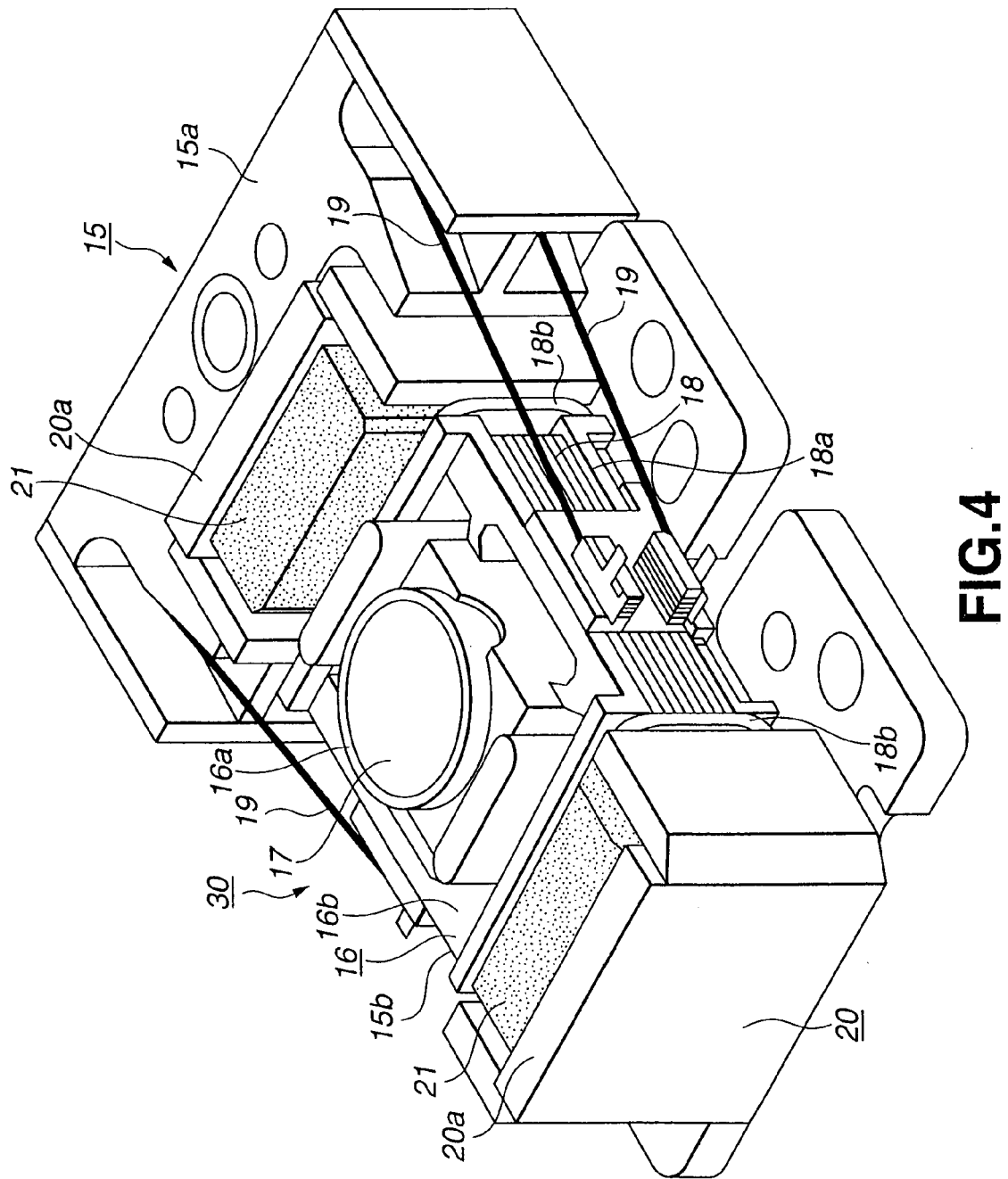
FIG. 4 is a perspective view of the biaxial actuator incorporated in the optical pickup.

As seen in FIG. 4, a biaxial actuator 15 is provided on the movable base 13. The actuator 15 serves as a lens-supporting mechanism. The biaxial actuator 15 comprises a fixed part 15a and a biaxial movable part 15b. The fixed part 15a is secured to the movable base 13. The biaxial movable part 15b comprises a holding member 16, an objective lens 17, and a coil section 18. The holding member 16 is composed of a lens holder 16a and a coil bobbin 16b that are formed integral with each other. The coil bobbin 16b protrudes from one side of the lens holder 16a. The lens holder 16a holds the objective lens 17. The lens 17 is pressed into or adhered to the lens holder 16a. The lens 17 may be secured to the lens holder 16 by any other appropriate method.

The optical pickup 12 of the structure described above further comprises a lens-inclination adjusting mechanism 30. The operating principle of the mechanism 30 will be described. Additionally, the relation between the inclination of the optical disc and the beam spot formed by the laser beam applied to the optical disc will be explained. Note that the inclination of the optical disc results from the warping and plane wobbling of the disc.

The biaxial movable part 15b provided in the optical pickup 12 of this invention is secured and electrically connected to the fixed part 15b by four suspensions 19, 19, . . . The suspensions 19 are thin wires made of electrically conductive and elastic material. The four suspensions 19 are arranged at different positions and have different spring constants that depend on their positions as will be specified later.

The fixed part 15a holds a yoke 20 that has a substantially U-shaped cross section. The yoke 20 comprises a pair of yoke strips 20a and 20a that oppose each other. Two magnets 21 are fixed to the opposing sides of the yoke strips 20a and 20a, respectively. The yoke strips 20a and 20a and the magnets 21 constitute a magnetic circuit, jointly with a focusing coil 18a and tracking coils 18b.

The optical disc drive 1 according to the invention is a device that drives either a DVD or a CD as explained earlier. It uses one of two laser beams of different wavelengths, i.e., 650 nm and 780 nm, in accordance with the type of the disc it drives. The objective lens 17 that the disc drive 1 incorporates is a so-called "bifocal lens."

In the optical disc drive according to this invention, the loading mechanism 8 pushes out the disc tray 7 from the opening 4a made in the front panel 4 when the user operates the operation section 5 provided on the front panel 4, inputting an unloading command to move the disc tray 7 to a disc insertion/removal position outside the housing 2. Once the disc tray 7 is pushed out, an optical disc can be placed in the recess 7a made in the disc tray 7. After the optical disc is placed in the recess 7a, the user may operate the operation section 5 again, inputting a loading command to move the disc tray 7 back into the housing 2. In response to this command the loading mechanism 8 pulls the disc tray 7 into the housing 2.

When the user operates the operation section 5, thus inputting a command to record or reproduce a data signal on or from the optical disc (DVD) 22a or the optical disc (CD) 22b, the base unit 9 is rotated, moving the disc table 11 upwards in FIG. 3. As a result, the center part of the disc table 11 is inserted into the center hole of the optical disc. The optical disc is thereby chucked to the disc table 11. The optical disc chucked to the table 11, i.e., the DVD 22a or the CD 22b, can therefore rotate together with the disc table 11. When the disc table 11 is driven to rotate by the spindle motor 10, the DVD 22a or the CD 22b is rotated together with the disc table 11. When the disc table 11 is rotated, the optical pickup 12 is moved from the inner circumference of the CD 22b or DVD 22a, which is spinning together with the disc table 11, toward the outer circumference of the CD 22b or DVD 22a, while guided by the pair of guide shafts 14. Meanwhile, a laser beam is applied to the signal-recording plane of the DVD 22a or CD 22b through the objective lens 17 held by the biaxial actuator 15. A data signal is written on the DVD 22a or the CD 22b, or a data signal recorded on the DVD 22a or the CD 22b is read.

The user may operate the operation section 5 provided on the front panel 4, inputting a command to stop the reproducing or recording of the data signal. If this is the case, the CD 22b or the DVD 22a is stopped. At the same time the optical pickup 12 is stopped. The optical pickup 12 therefore stops reproducing or recording the data signal. The base unit 9 is rotated downwards (FIG. 3), or in the direction opposite to the above-mentioned direction. The CD 22b or the DVD 22a is thereby released from the disc table 11, the optical disc is placed in the recess 7a of the disc tray 7, and the base unit 9 moves to a position below the disc tray 7.

The user may operate the operation section 5, inputting a command to push the disc tray 7 out of the housing 2. In this case, the disc tray 7 is pushed out from the housing 2 through the opening 4a. Hence, the CD 22b or the DVD 22a can be removed from the recess 7a. When the user removes the CD 22b or the DVD 22a and operates the operation section 5, thus inputting a command to pull the disc tray 7 into the housing 2, the disc tray 7 is pulled into the housing 2.

Figure 5:
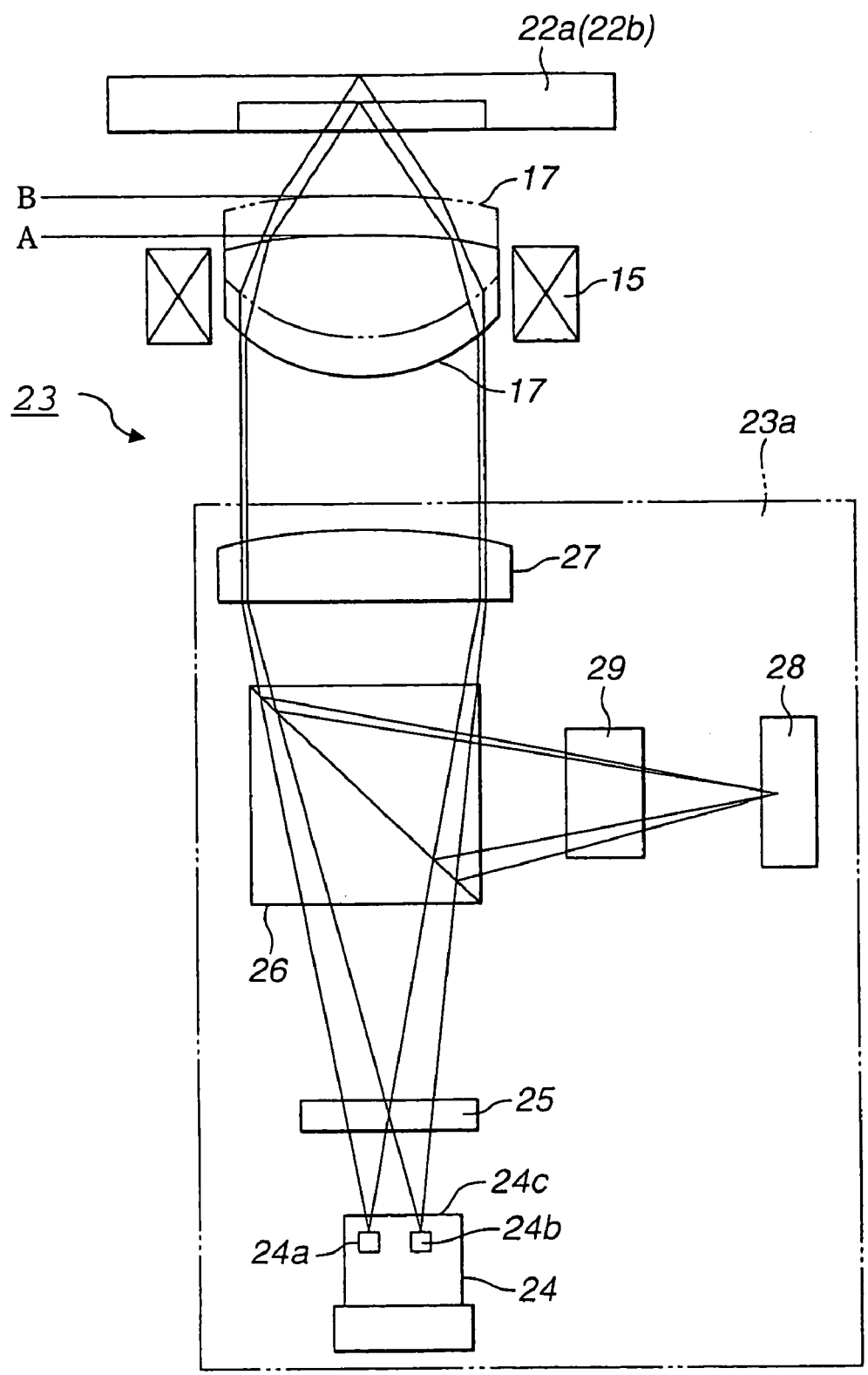
FIG. 5 is a side view of the optical system of the optical pickup, illustrating the basic structure of the optical pickup.
Figure 6:
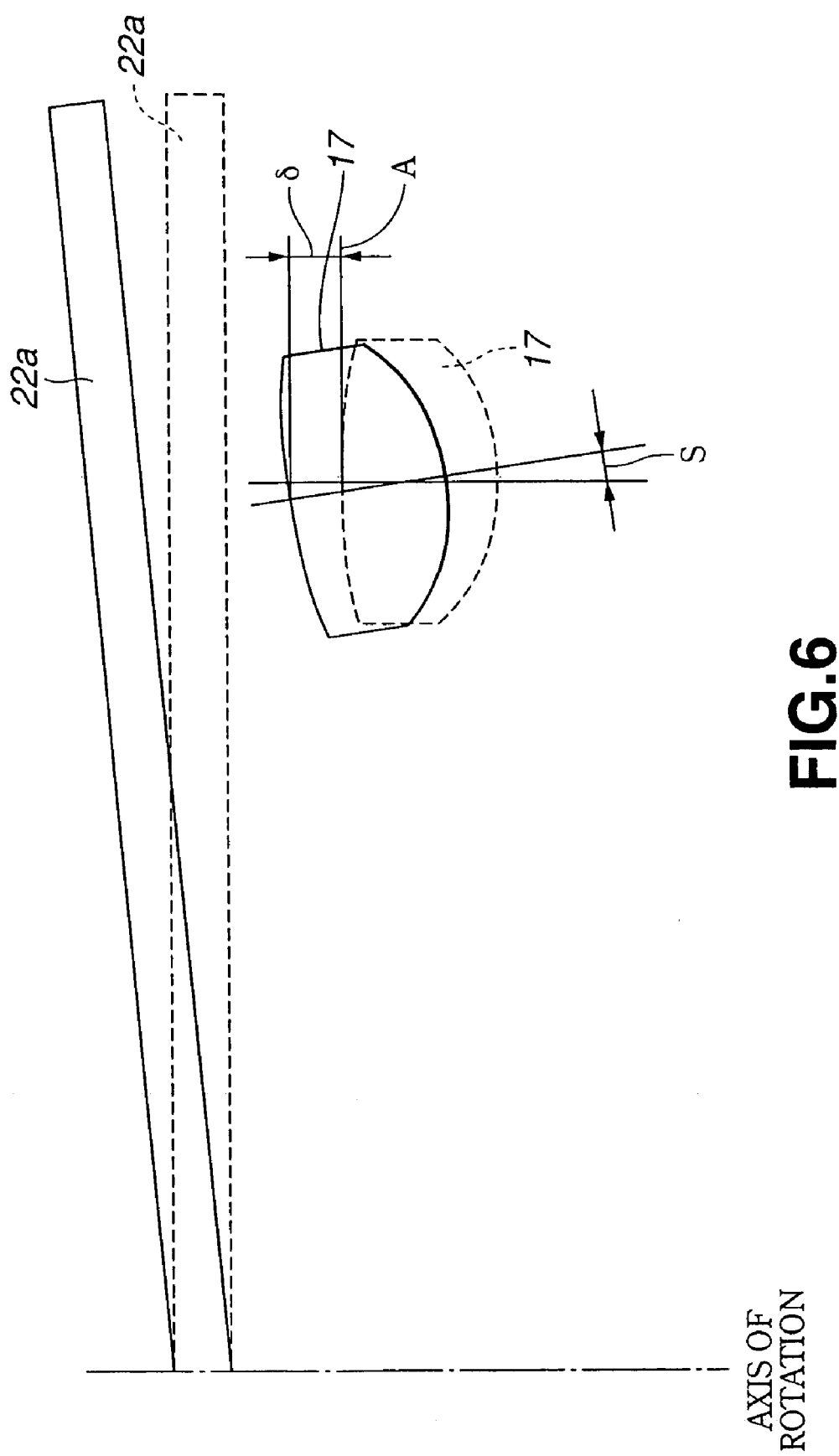
FIG. 6 is a diagram explaining the operation of a lens-inclination adjusting mechanism.
Figure 7:
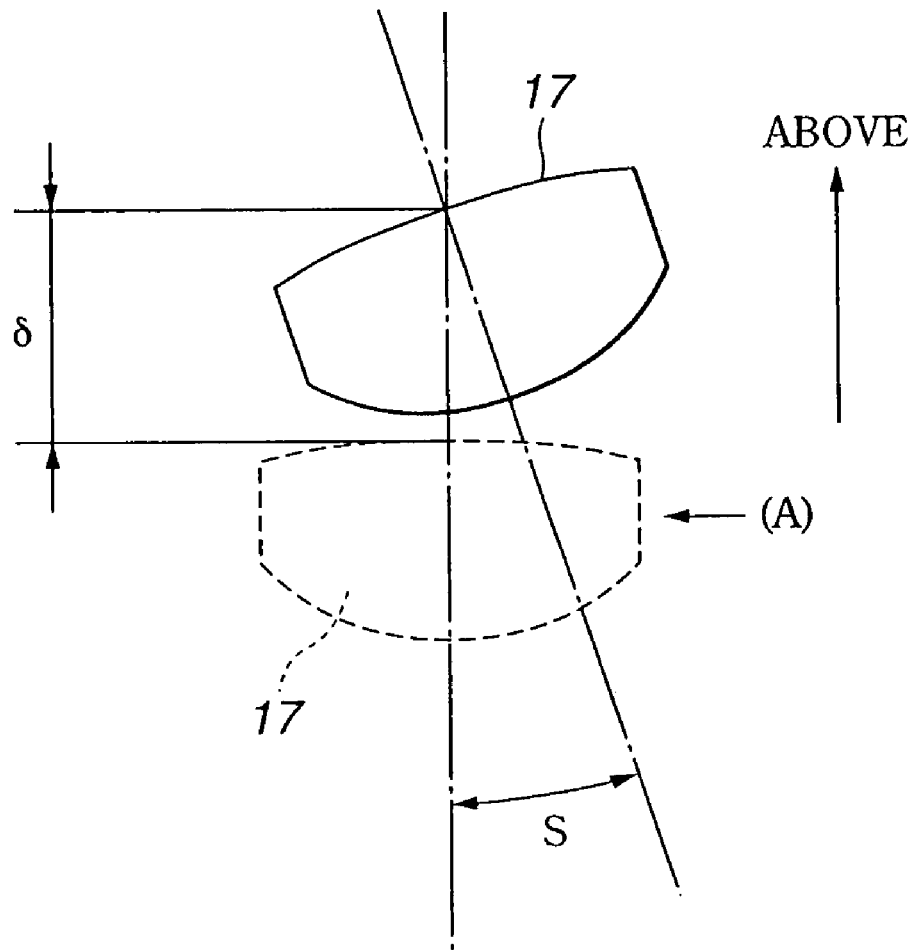
FIG. 7 is another diagram explaining the operation of the lens-inclination adjusting mechanism.

From FIG. 5, the optical system 23 of the optical pickup 12, which emits a laser beam, will be described.

The optical system 23 comprises an optical base 23a. All other components of the system 23, except the objective lens 17, are secured in place on the optical base 23. The optical system 23 comprises two light sources 24a and 24b that emit a laser beam having a wavelength of 650 nm and a laser beam having a wavelength of 780 nm, respectively. The light source 24a that emits a 650-nm laser beam is provided for DVDs, whereas the light source 24b that emits a 780-nm laser beam is provided for CDs. Both light sources 24a and 24b are arranged on the same support member 24c and provided in the form of a single laser element 24. The optical system 23 comprises, besides the objective lens 17, a diffraction element 25, a beam splitter 26, a collimator lens 27, a light-receiving element (PDIC) 28, and an optical element 29. The diffraction element 25 diffracts the 780-nm laser beam to be applied to the CD 22b, thereby to form a beam spot that serves to achieve tracking servo. The beam splitter 26 allows passage of a laser beam or reflects the same. The light-receiving element 28 receives the laser beam reflected by the signal-recording plane of the DVD 22a or CD 22b. The optical element 29 functions as a means for combining the paths of laser beams having different wavelengths, thereby applying the laser beams at the same position on the light-receiving element 28. The optical element performs another function; it makes the laser beams undergo astigmatism, thereby to generate a focusing error signal.

The DVD 22a and the CD 22b, both used in the optical disc drive 1, have essentially the same thickness. Nonetheless, they differ in terms of operating point, i.e., the position where the laser beam is focused to form a beam spot. This is because their signal-recording planes are different in position. More specifically, the DVD 22a and the CD 22b have operating points at different distances from the incident plane of the laser beam, the distance of one is longer than the other by 0.6 mm, when both discs are placed at the same level on the disc table 11. This difference of 0.6 mm results in a difference in spherical aberration. The difference in spherical aberration must be eliminated to focus the laser beams on both the DVD 22a and the CD 22b as is desired. To this end, the objective lens 17 used in the optical disc drive 1 is a so-called "bifocal lens" as pointed out above. Although the DVD 22a and the CD 22b have the same thickness, they may be regarded as a thin disc and a thick disc, respectively, since their signal-recording planes lie at different levels.

However, the objective lens 17 cannot help to eliminate the operating point difference of 0.6 mm though it is bifocal lens. The objective lens 17 is therefore driven by the biaxial actuator that includes the lens-supporting mechanism 15. Thus driven, the lens 17 moves along its optical axis and in the focusing and tracking directions which are respectively parallel and perpendicular to the optical axis. Hence, the lens 17 focuses the laser beam, forming a desirable beam spot on the recording track of the DVD 22a or the CD 22b, thereby to read or write data reliably from or on the recording track. The objective lens 17, i.e., the bifocal lens, is designed to have two theoretical operating points which are spaced in the focusing direction. The lens operates at one of these operating points to record and reproduce data signals on and from CDs, and at the other operating point to record and reproduce data signals on and from DVDs. To be more specific, the objective lens 17 has the operation point at position A (hereinafter called "basic operating point" shown in FIG. 5) for the DVD 22a, and at position B (hereinafter called "basic operating point," shown in FIG. 5) for the CD 22b.

The biaxial actuator 15, which supports the objective lens 17 and moves the same in both the focusing direction and the tracking direction, comprises the lens-inclination adjusting mechanism 30. This mechanism 30 inclines the objective lens 17 by an inclination angle S to the radial direction of the DVD 22a (The angle S has a positive value when the outer circumference of the DVD 22a approaches the lens 17). The angle S is proportional to the displacement distance δ (mm) the objective lens 17 has moved from the basic operating point A to record or reproduce data signals on or from the DVD 22a.

The lens-inclination adjusting mechanism 30 is a mechanism that utilizes the function of the biaxial actuator 15 to incline the objective lens 17. To enable to the mechanism 30 to incline the lens 17, only some of the components of the biaxial actuator 15 have been mechanically modified.

Namely, the lens-inclination adjusting mechanism 30 functions as is described in Jpn. Pat. Appln. Laid-Open Publication 2001-319353 filed by the applicant and also in U.S. patent application Ser. No. 09/842,868 that corresponds to Publication 2001-319353. Though not detailed here, the mechanism 30 is designed by modifying the biaxial actuator 15. For example, the four suspensions 19, 19, ... that secure the biaxial movable part 15b to the fixed part 15a may have their spring constants changed, while having the same diameter. Alternatively, the suspensions 19 may have different diameters to acquire different spring constants. More precisely, the pair of suspensions 19 that lie near the inner circumference of the disc may have greater spring constants than the pair of suspensions 19 that lie near the outer circumference of the disc. Otherwise, the pair of suspensions 19 that lie near the inner circumference of the disc may have larger diameters than the suspensions 19 that lie near the outer circumference of the disc. In either way, the suspensions 19 near the inner circumference of the disc will have greater spring constants than the pair of suspensions 19 near the outer circumference. This will make it possible to incline the objective lens 17 at a prescribed angle that is proportional to the distance δ the lens 17 has moved from the basic operating point A to the basic operating point B.

The objective lens 17 is displaced from the basic operating point A, because the distance between the objective lens 17 and the signal-recording plane of the DVD 22a increases if the DVD 22a is warping or undergoes plane wobbling. If the lens 17 is so displaced, its focal point does not coincide with the basic operating point A. The biaxial actuator 15 therefore moves the objective lens 17 in the focusing direction.

A method will be explained in which the lens-inclination adjusting mechanism 30 inclines the objective lens 17 at an optimal angle to correct the inclination resulting from the warping or plane wobbling of the DVD 22a.

The distance δ of displacement and the inclination angle S have the following relation:

$$S = T \cdot \delta \quad (1)$$

where T (deg/mm) is the proportionality constant.

The proportionality constant T is a constant determined by the radius R (mm) of the DVD 22a that is a thin optical disc.

Figure 8:
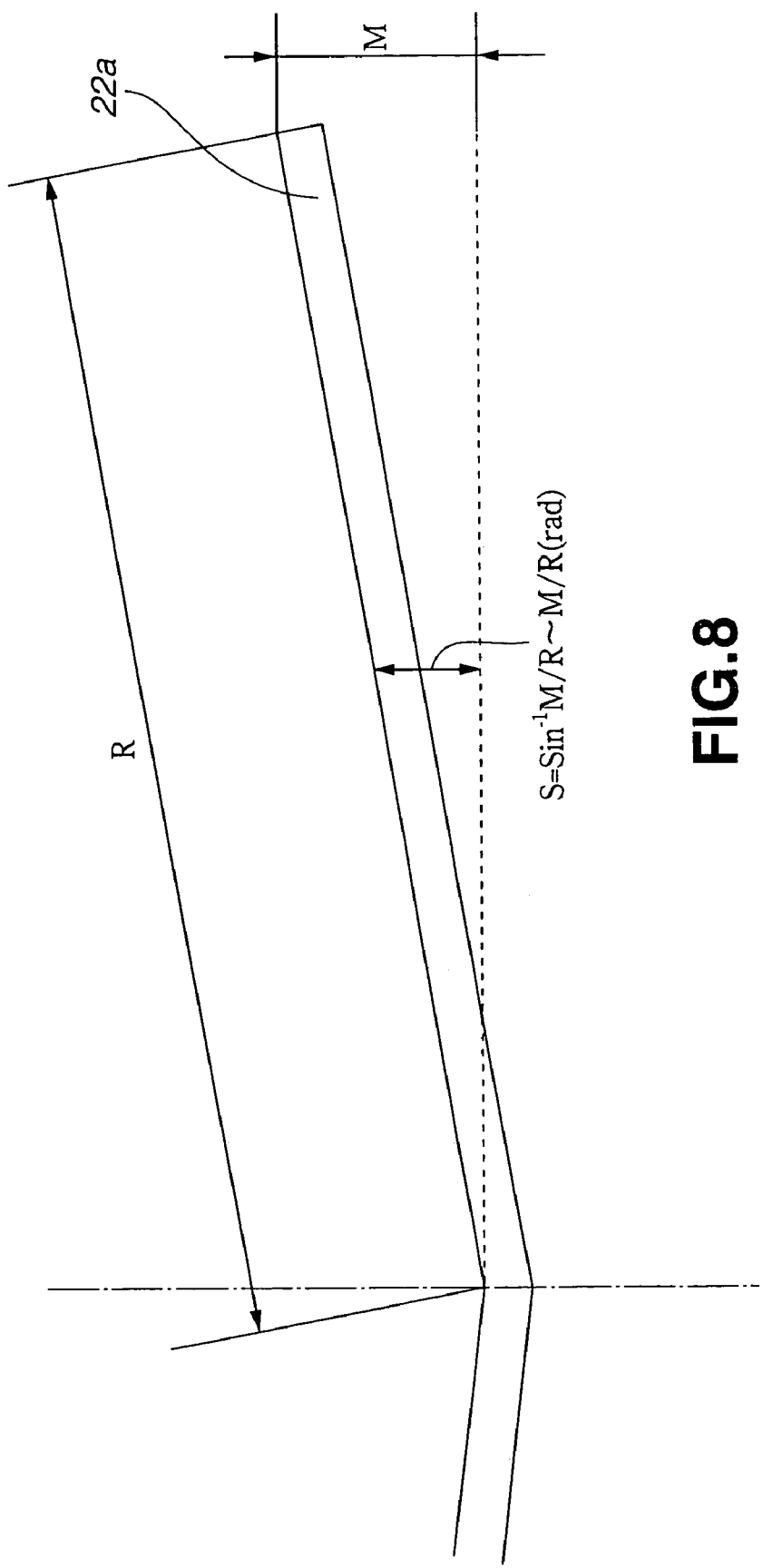
FIG. 8 is a schematic diagram showing a warping optical disc.

Assume that the DVD 22a is warped. As FIG. 8 shows, the DVD 22a has a radius R and a warp M (mm) at its outer circumference. As seen from FIG. 8, the warp M of the DVD 22a is uniform from the center of the DVD 22a to the outer circumference thereof. As already explained in connection with the conventional art, most optical discs inevitably warp and undergo plane wobbling. The warping or plane wobbling results in the displacement of the signal-recording plane of an optical disc, or the inclination of the objective lens to the optical disc. Consequently, coma-aberration will occur, which deteriorates the beam spot that the beam forms as it is focused on the signal-recording plane.

The lens-inclination adjusting mechanism 30, which is incorporated in the biaxial actuator 15, inclines the objective lens 17 in proportion to the displacement distance δ defined by Equation 1. The mechanism 30 thus eliminates the deterioration of the beam spot, which results from the coma-aberration. The disc drive 1 can therefore record and reproduce data signals on and from the DVD 22a with high reliability.

Figure 9:
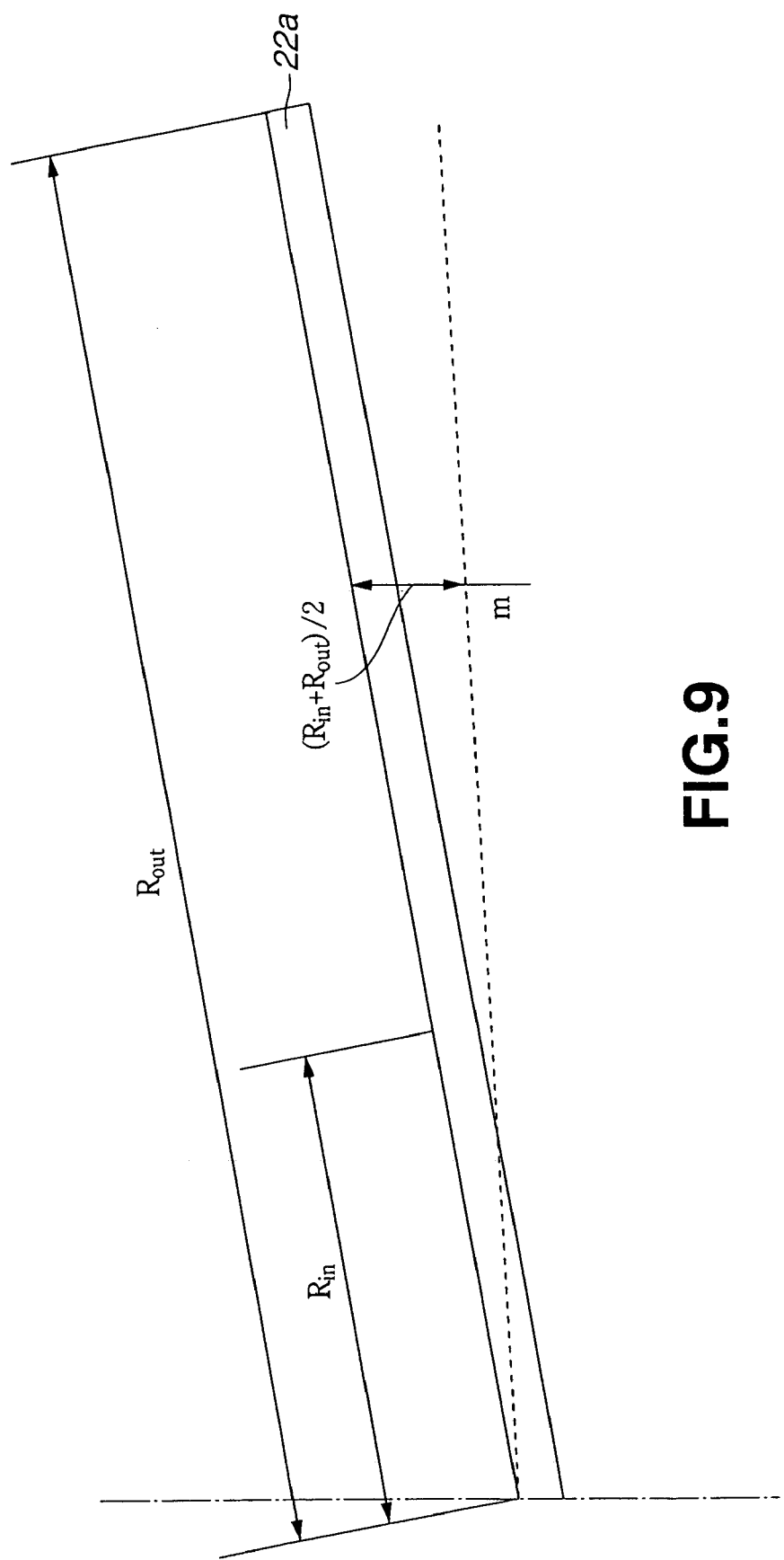
FIG. 9 is a diagram explaining how the signal-recording plane of the optical disc is displaced when the optical disc warps.

As illustrated in FIG. 9, the inner and outer circumferences of the DVD 22a are at distances $R_{in}$ and $R_{out}$ from the center of the DVD 22a. The middle part of the signal-recording plane is then located at distance $(R_{in}+R_{out})/2$ from the center of the DVD 22a. In this case, it is required that the proportionality constant T be a value such that the lens inclines at the same angle, $M/R \cdot 180/\pi$ (deg), as the signal-recording plane of the disc. If the constant T has this value, it is possible to minimize the deterioration of the beam spot, which results from the coma-aberration. The displacement m at this position is expressed by the following Equation 2:

$$m = \frac{R_{in} + R_{out}}{2R} \cdot M \quad (2)$$

Substituting Equation 2 in Equation 1 yields the following Equation 3 since m=δ (displacement of the objective lens 17):

$$\frac{M}{R} \cdot \frac{180}{\pi} = T \cdot \frac{R_{in} + R_{out}}{2R} \cdot M \quad (3)$$

Equation 3 reduces to the following Equation 4, eliminating M and R:

$$T = \frac{2}{R_{in} + R_{out}} \cdot \frac{180}{\pi} (deg/mm) \quad (4)$$

Figure 10:
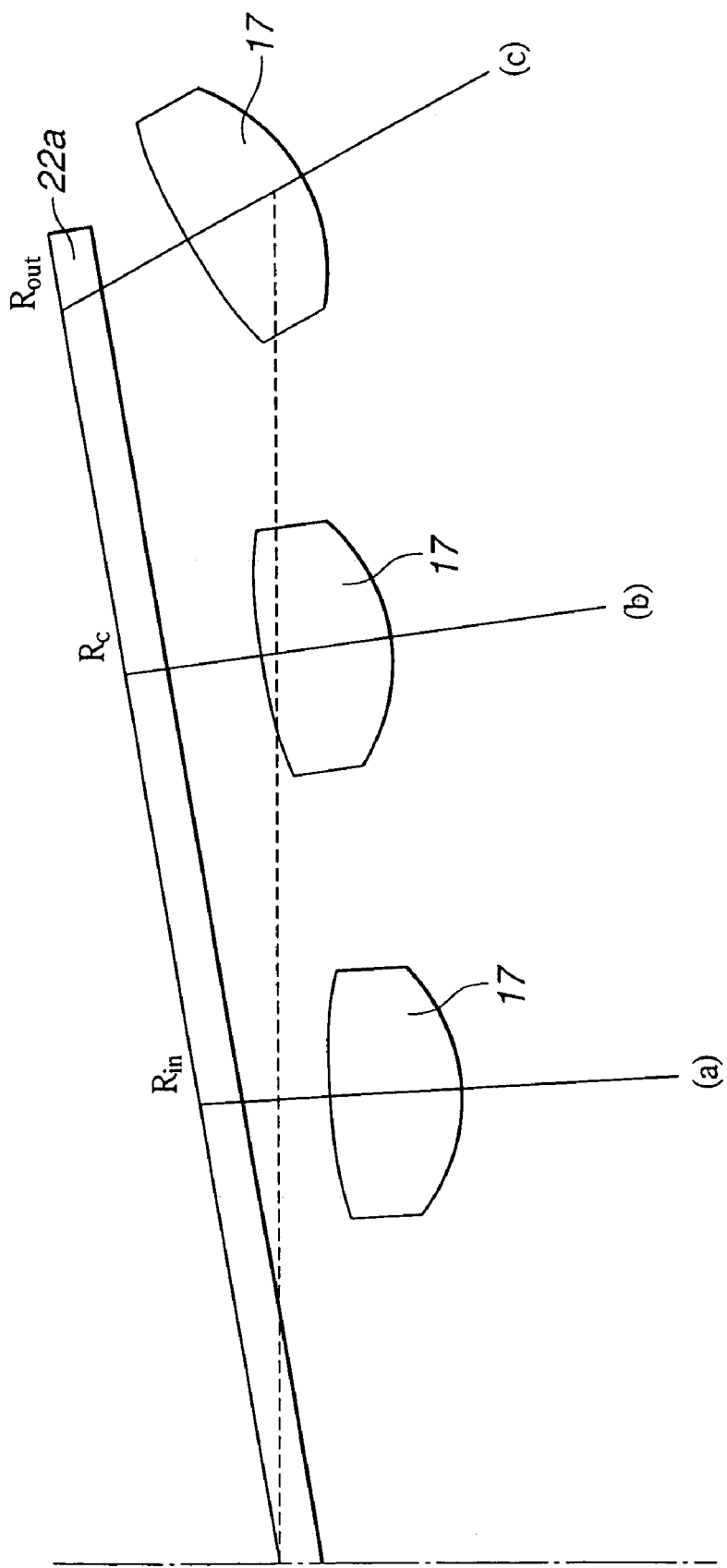
FIG. 10 is a diagram representing the relation between the displacement of the signal-recording plane and the inclination of the objective lens, which is observed at various positions along the radius of the optical disc.

FIG. 10 is a diagram that shows how the angle at which the objective lens 17 is inclined to a warping optical disc when the proportionality constant T is of the value defined by Equation 4. In FIG. 10, the position (b) is the position that the objective lens 17 should take to record or reproduce data signals on or from the middle part of the signal-recording plane. The angle at which the lens 17 should be inclined at this position (b) is equal to the inclination angle M/R of the optical disc. The position (a) shown in FIG. 10 is one that the objective lens 17 must assume to record or reproduce data signals on or from the innermost part of the signal-recording plane. The position (c) shown in FIG. 10 is one that the objective lens 17 should assume to record or reproduce data signals on or from the outermost part of the signal-recording plane. Hence, the coma-aberration is insufficiently reduced when the objective lens 17 lies at the position (a) depicted in FIG. 10, and is excessively reduced when the objective lens 17 lies at the position (c) depicted in FIG. 10. In the case of an optical disc whose $R_{in}$ and $R_{out}$ are 24 (mm) and 58 (mm), respectively, T=1.397 (deg/mm). The position (b) shown in FIG. 10 depicts the center of the signal-recording plane.

It is desired that the proportionality constant T should satisfy the following Equation 5, in order to record or reproduce data signals in good conditions:

$$\frac{1}{4} \cdot \frac{1}{R} \cdot \frac{180}{\pi} \leq T \geq \frac{2}{R_{in} + R_{out}} \cdot \frac{180}{\pi} \quad (5)$$

If the proportionality constant T exceeds the upper limit specified in Equation 5, the astigmatism will increase greater than the coma-aberration in the course of recording or reproducing data signals on or from the outer parts of the disc, because of the extra-axial characteristic of the objective lens 17. This would deteriorate the beam sport. Conversely, if proportionality constant T does not reach the lower limit, the coma-aberration is insufficiently reduced. In this case, too, the beam spot is deteriorated.

The objective lens 17 may be displaced from the basic operating point A by the distance δ due to the warping of the DVD 22a, which has taken place during the manufacture thereof or due to the deformation (plane wobbling) of the mechanism that holds and rotates the DVD 22a. In this case, the lens-inclination adjusting mechanism 30, designed by mechanically modifying some of the components, inclines the objective lens 17 by angle S (=T·δ) that is substantially proportional to the displacement, while data signals are being recorded or reproduced on or from the DVD 22a. The objective lens, thus inclined by angle S, prevents the beam spot from being deteriorated in spite of the coma-aberration caused by the warping or plane wobbling of the DVD 22a. This renders it possible to record and reproduce data signals in optimal conditions.

It will be explained how the optical pickup 12 comprising the lens-inclination adjusting mechanism 30 operates to record or reproduce data signals on or from a CD (a thick optical disc) 22b.

Figures 11A, 11B:
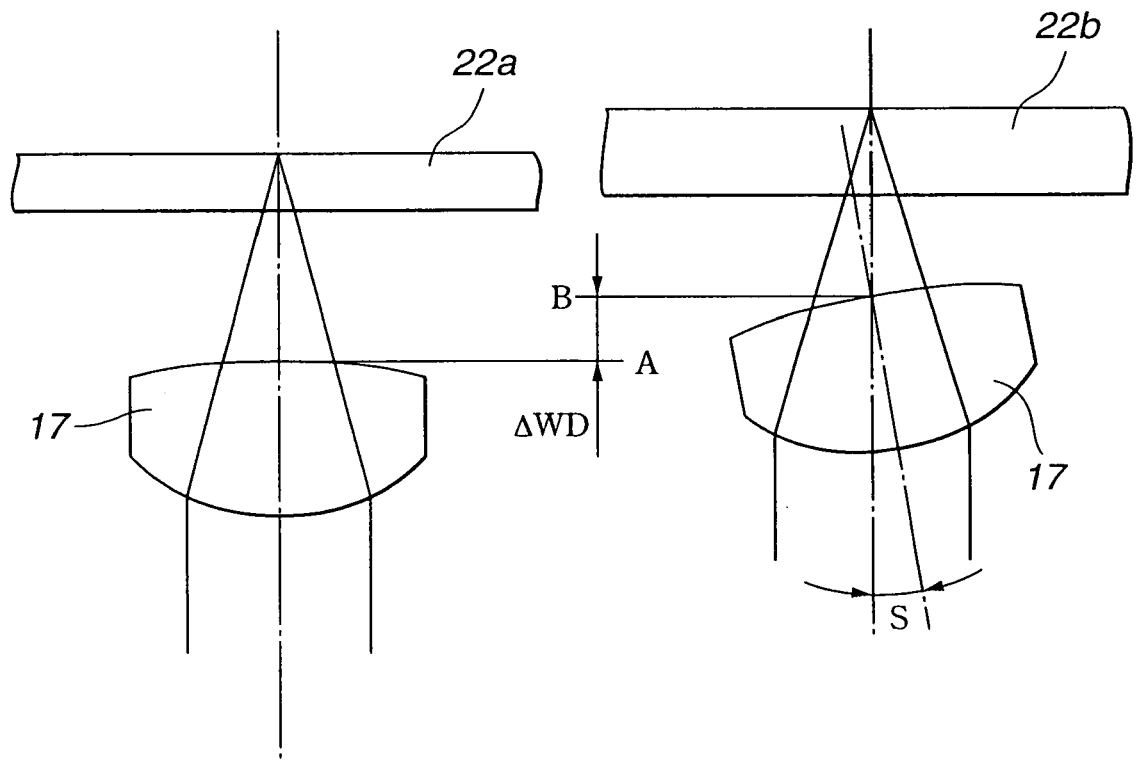
FIGS. 11A and 11B are diagrams showing the positions that the objective lens takes with respect to optical discs of different specifications when it is moved to record or reproduce data signals on or from the optical discs.

To record or reproduce data signals on or from the CD 22b by applying a laser beam to the CD 22b through the objective lens 17, the biaxial actuator 15 moves the objective lens 17 from the basic operating point A to the basic operating point B as illustrated in FIGS. 11A and 11B. Namely, the objective lens 17 approaches the surface of the CD 22b by a distance AWD from the position where it serves to record or reproduce data signals on or from the DVD 22a, i.e., thin optical disc.

The lens-inclination adjusting mechanism 30 operates as the objective lens 17 moves along its optical axis due to the difference in the position of the signal-recording plane, between the DVD and the CD. Since the distance between the two basic operating points A and B is ΔWD (mm), the lens-inclination adjusting mechanism 30 inclines the objective lens 17 by angle S=T·ΔWD (deg) obtained from Equation 1, no matter whether the CD 22b is inclined due to warping or plane wobbling. Generally, coma-aberration takes place when the objective lens is inclined as shown in FIG. 12A or the optical disc is inclined as shown in FIG. 12B. If the objective lens has a numerical aperture (NA) of, for example, 0.45, coma-aberration exceeding 0.06 λrms per degree (1°) of inclination will occur, whether the objective lens or the optical disc is inclined.

Coma-aberration $C_T$ occurs when the objective lens 17 is inclined to the CD 22b. This means that the coma-aberration can be eliminated if the objective lens 17 and the CD 22b are moved to become parallel as much as is possible.

Figure 13:
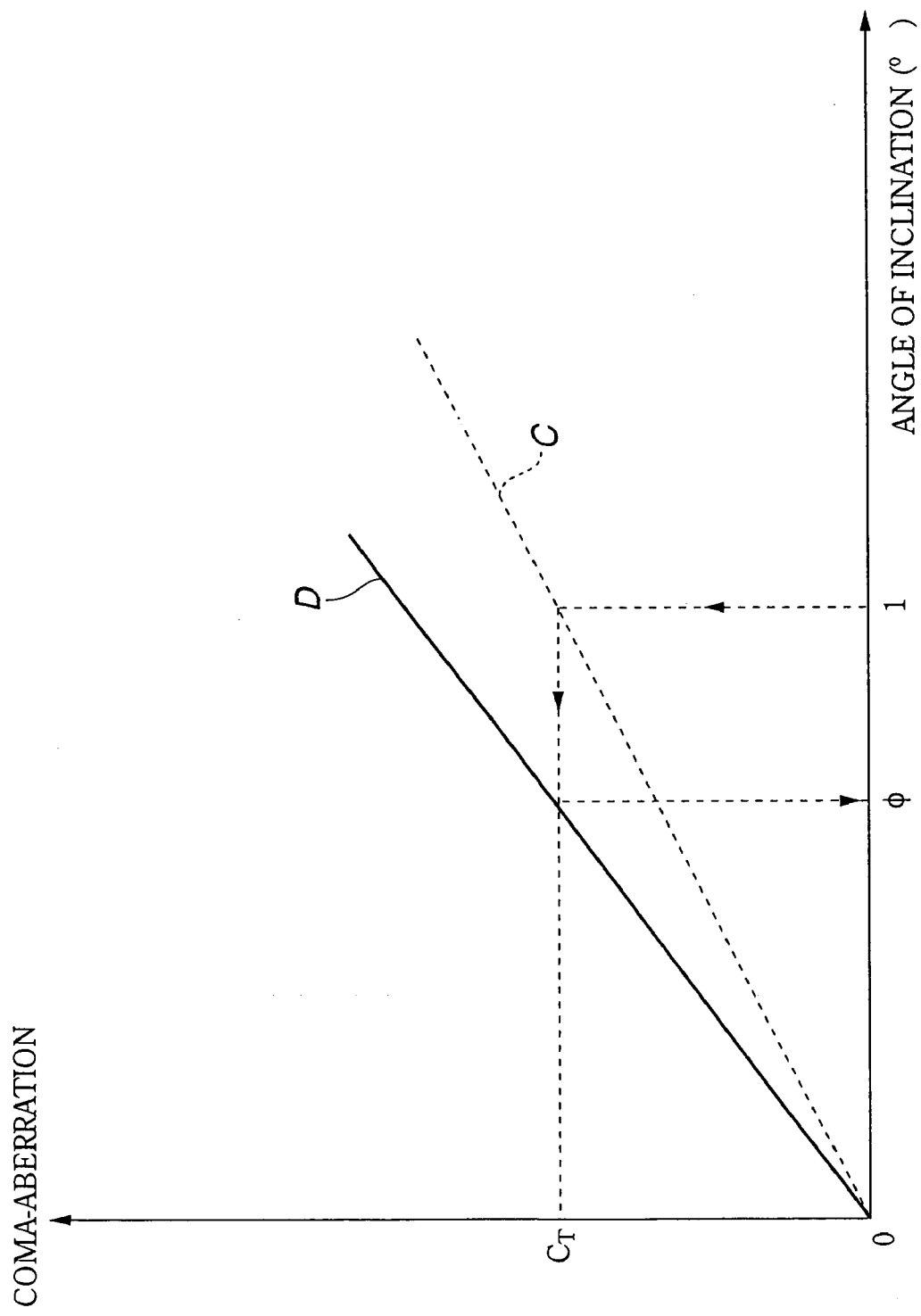
FIG. 13 is a graph representing the relation between the inclination of the objective lens or optical disc and the coma-aberration.

The coma-aberration $C_T$, which occurs when the objective lens 17 is inclined by 1° to the CD 22b and which is indicated by broken line in FIG. 13, can be eliminated if the CD 22b is inclined by angle Ø (deg) as seen from the solid line D shown in FIG. 13.

Hence, the coma-aberration can be eliminated at the time of recording or reproducing data signals on or from the CD 22b, by inclining the CD 22b to the objective lens 17 by the angle (deg) given by the following Equation 6:

$$T \cdot \Delta WD \cdot \varnothing \quad (6)$$

The CD 22b cannot be inclined to the objective lens 17 by the angle determined by Equation 6, during the process of recording or reproducing signals on or from the CD 22b, unless the optical disc drive 1 has an additional mechanism for inclining the CD 22b. The use of such an additional mechanism complicates the structure of the optical disc drive 1 and raises the manufacturing cost thereof. This contradicts the object of the present invention.

The present invention uses no additional mechanisms and can yet eliminate the drawback resulting from the inclination of the objective lens 17 while data signals are being recorded or reproduced on or from the CD 22b, without the necessity of inclining the CD 22b. As will be detailed later, the light source 24b that serves to record or reproduce signals on or from the CD 22b is arranged off the optical axis and applies a laser beam slantwise to the objective lens 17. Thus, the objective lens 17 would not adversely influence the beam spot when it is inclined at the basic operating point B. The method of nullifying the influence that the objective lens 17 inclined by angle T·ΔWD at the basic operating point B imposes on the beam spot will be described below in detail.

Figure 14:
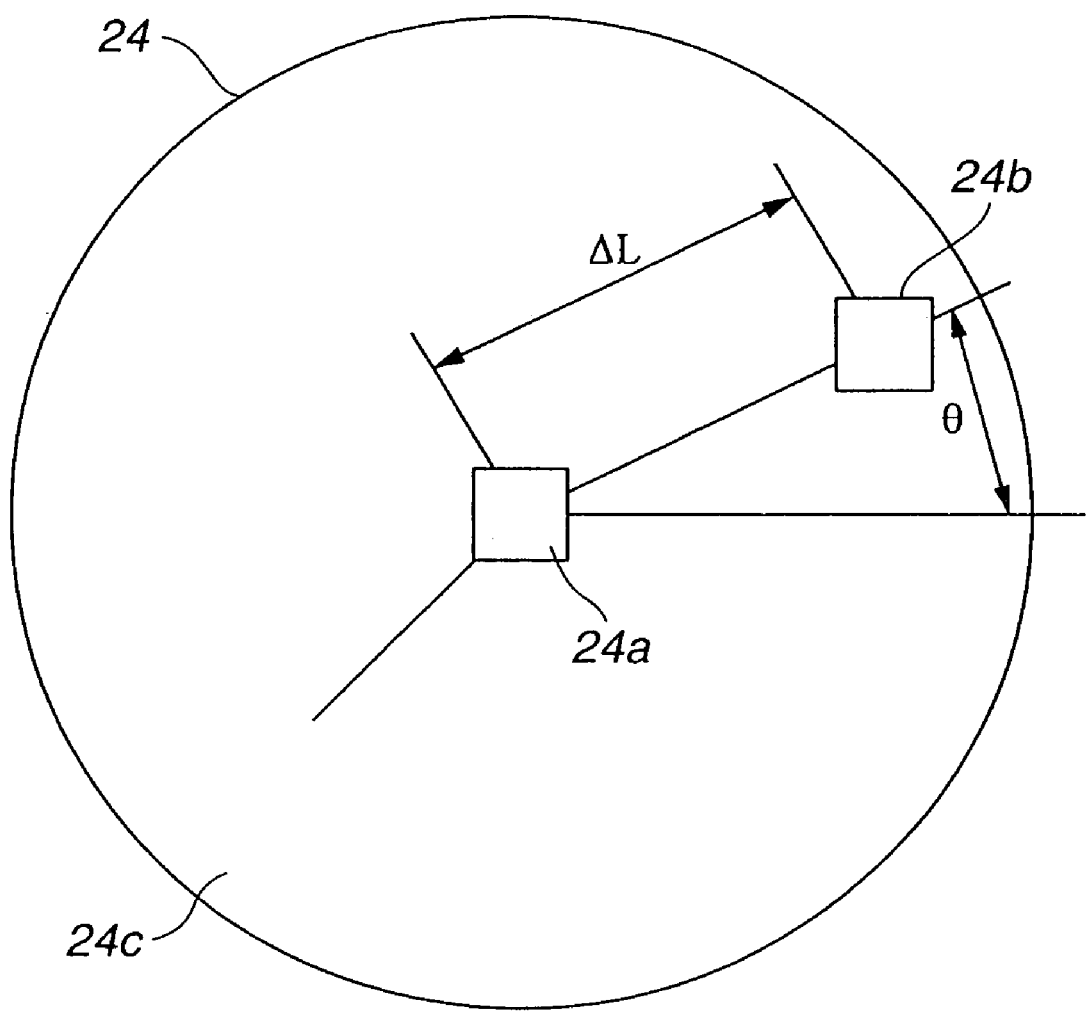
FIG. 14 depicts the positional relation of the two light sources provided in a laser.

As shown in FIG. 14, the second light source 24b of the laser element 24, which is used for the CD 22b, is located at a distance ΔL (mm) from the first light source 24a used for the DVD 22a lying on the optical axis and at an angular distance θ (measured counter clockwise from the intersection of the radius and the outer circumference). The laser beam applied to the CD 22b to record or reproduce data signals is inclined by angle γ, which is determined by the following Equation 7;

$$\tan\gamma = \frac{\Delta L}{fCL} \quad (7)$$

where fCL (mm) is the focal distance of the collimator lens 27.

In Equation 7, the beam inclination γ can be decomposed into a radial part and a vertical (tangent) part, which are represented by γ cos θ and γ sin θ, respectively.

Figure 15A:
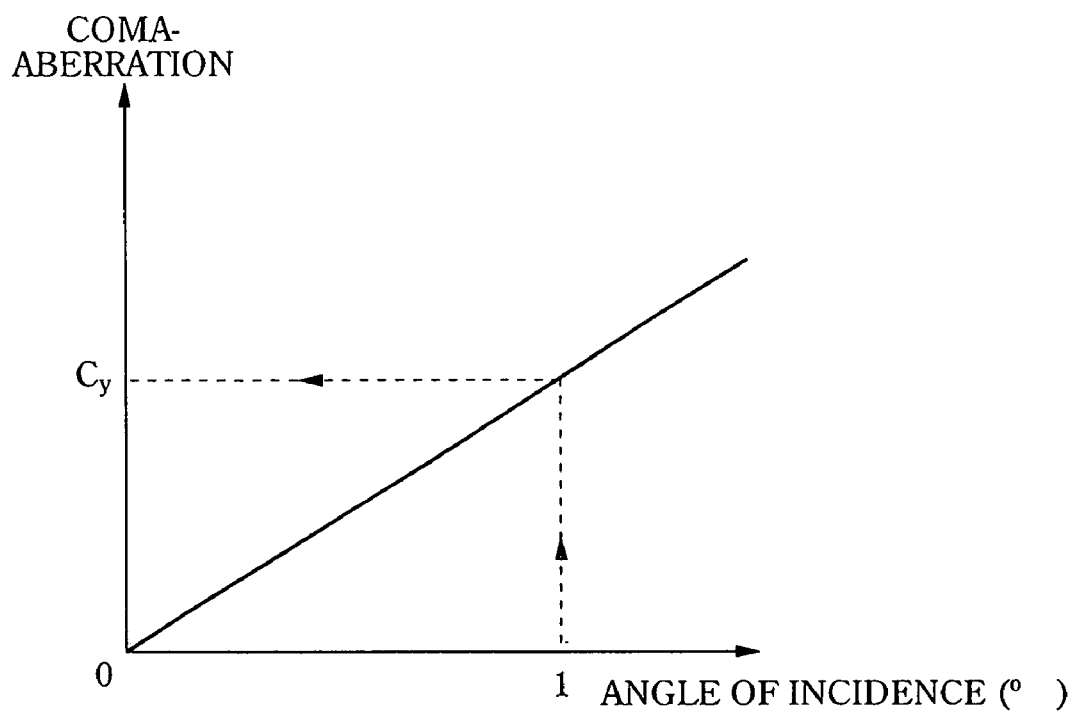
FIG. 15A is a graph showing the relation between the coma-aberration and the incident angle of a laser beam applied to the objective lens.
Figure 15B:
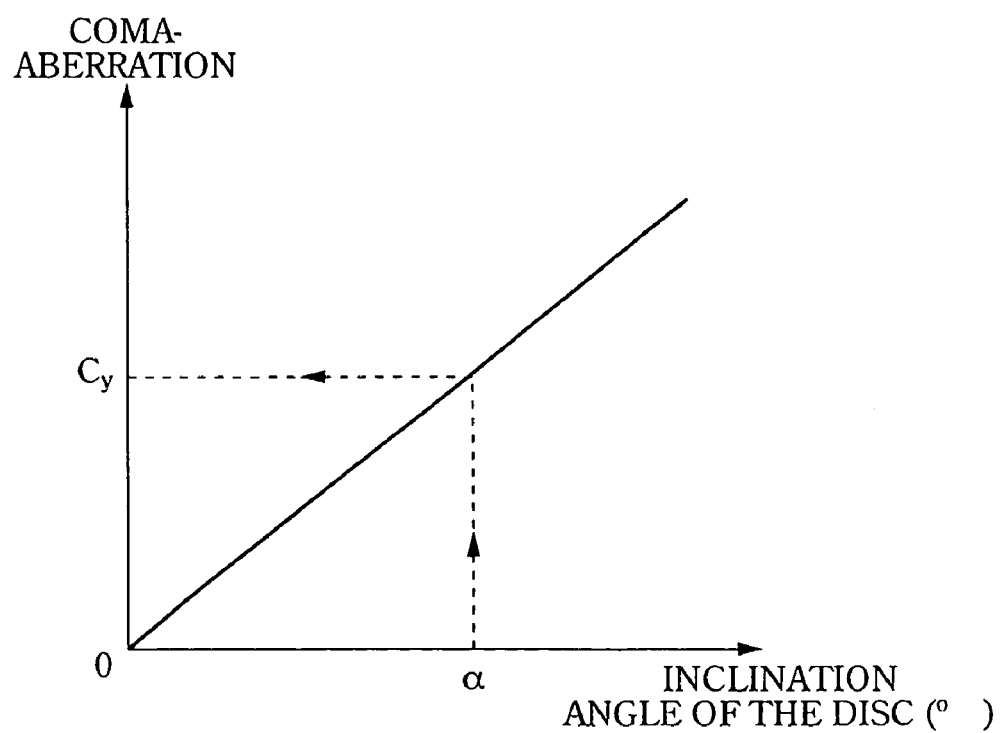
FIG. 15B is a graph representing the relation between the inclination of the optical disc and the coma-aberration.

In the process of recording or reproducing data signals on or from the CD 22b by applying a laser beam via the objective lens 17, as shown in FIGS. 15A and 15B, coma-aberration Cy occurs when the beam applied from the light source 24b is inclined to the objective lens 17 by the unit angle. To eliminate this coma-aberration Cy, the CD 22b needs to be inclined at a specific angle α (deg) to record or reproduce signals in optimal conditions (the direction in which the CD 22b should be inclined at the angle α is regarded as positive). When the objective lens 17 lies perpendicular to the optical axis, data signals will be recorded or reproduced on or form the CD 22b most reliably if the CD 22b is inclined in the directions given by the following Equation 8:

(a) Radial direction: $\alpha\gamma\cos\theta$ (b) Tangential direction: $\alpha\gamma\sin\theta$ (8)

From Equations 6 and 8, it is clear that data signals can be recorded or reproduced on or from the CD 22b in the most desirable way if the CD 22b is inclined to both the radial direction and the tangential direction by angles specified by the following Equation 9:

(a) Radial direction: $\Delta\text{Tilt(rad)}=T\cdot\Delta WD\cdot\varnothing+\gamma\alpha\cos\theta$ (b) Tangential direction: $\Delta\text{Tilt(tan)}=\gamma\alpha\sin\theta$ (9)

In most optical pickups that can record and reproduce data signals on and from various types of optical discs, the components for supporting and rotating an optical disc (e.g., disc table 11 and the like) need to be made of the same material to reduce the manufacturing cost and to simplify the structure. In view of this, it is practically impossible to incline the CD 22b. Thus, measures are taken in this invention to both values (a) and (b) in Equation 9 and are reduced to zero, thereby preventing the deterioration of the beam spot. This renders it possible to record and reproduce data signals with high reliability.

In practice, it suffices to give a negative value to $\cos\theta$, i.e., the second term of (a) of Equation 9, since T, $\Delta$WD, $\varnothing$, $\gamma$, and $\alpha$ are usually positive values. Considering (b) of Equation 9, it is desired that $\theta$ should fall within the range of $120°\leq\theta\leq240°$.

Considering the errors in manufacturing, the tolerance for the inclination angle should be 0.2° or less for the tangential direction and ±0.3° or less for the radial direction. If this requirement is achieved, the deterioration of data signals recorded or reproduced will fall within the tolerable margin. Thus, it is sufficient to satisfy the following Equation 10:

(a) $|\Delta\text{Tilt(rad)}|\leq0.3$ (b) $|\Delta\text{Tilt(tan)}|\leq0.2$ (10)

In the optical disc drive 1 incorporating the optical pickup 12, data signals can be reliably recorded and reproduced on and from the CD 22b even when the lens-inclination adjusting mechanism 30 inclines the objective lens 17 at the operating point B as shown in FIGS. 11A and 11B, only if the following Equation 11 is satisfied.

$$(a) -0.3 \leq T\cdot\Delta WD\cdot\phi + \tan^{-1}\left(\frac{\Delta L\cdot|\beta|}{f}\right)\cdot\alpha\cdot\cos\theta \leq 0.3 \quad (11)$$

$$(b) -0.2 \leq \tan^{-1}\left(\frac{\Delta L\cdot|\beta|}{f}\right)\cdot\alpha\cdot\sin\theta \leq 0.2$$

where $\beta$ is the imaging magnification of the optical system 23 and f is the focal distance of the objective lens 17.

When signals are recorded or reproduced on or from the CD 22b, the light source 24b of the laser element 24, which is provided for CDs, is located at distance $\Delta L$ from the light source 24a provided for DVDs and inclined at angle $\theta$. Then, the laser beam emitted from the light source 24b is applied slantwise to the objective lens 17, thereby eliminating the coma-aberration caused because the lens-inclination adjusting mechanism 30 has inclined the objective lens 17 at angle S ($=T\cdot\Delta WD$). Now that the coma-aberration has been eliminated, the beam spot is not deteriorated at all. Hence, data signals can be recorded and reproduced in good condition.

As has been described, the present invention provides an optical pickup 12 and an optical disc drive 1 which can record and reproduce data signals from optical discs (e.g., a CD and a DVD) of different specifications, by using one and the same objective lens. In the optical pickup 12 and the optical disc drive 1, a lens-inclination adjusting mechanism 30 is provided. The mechanism 30 is designed by modifying mechanical features, without using additional components. The mechanism 30 inclines the objective lens 17, eliminating the deterioration of the beam spot, caused by the warping of the disc, the deformation of the disc-rotating mechanism or the plane wobbling occurring while the disc is being rotated. A laser beam is applied slantwise to the CD 22b by moving the light source 24b from the optical axis, in spite of the fact that the lens-inclination adjusting mechanism 30 has inclined the objective lens 17 because the objective lens 17 is located closer to the signal-recording plane of the CD 22b than to that of the DVD 22a. Thus, a beam spot free of deterioration—can be formed on both types of optical discs. Therefore, data signals can be recorded and reproduced on and from both types of optical discs, in optimal conditions.

The shape and structure of any component of the embodiment described above are no more than examples. They should not be interpreted to limit the present invention.

INDUSTRIAL APPLICABILITY

As described above, the optical pickup and an optical disc drive comprising this pickup can prevent deterioration of the beam spot and can therefore record and reproduce data signals, in optimal conditions, on two types of optical discs that differ in specifications, such as recording density and thickness. In particular, the deterioration of the beam spot formed on the disc of one type, caused by the warping of the disc, is eliminated to record or reproduce data signals on or from the optical disc. Further, data signals can be recorded and reproduced on and from the disc of the other type even if the beam spot formed on the disc is deformed since a lens-inclination adjusting mechanism inclines the object lens. Thus, it is possible to record and reproduce the data signals on and from either type of an optical disc in good condition.

The invention claimed is:

1. An optical pickup designed to record or reproduce data signals on or from two types of optical discs that differ in at least data recording density and thickness, by using the same objective lens, said optical pickup comprising:

two light source sections for emitting laser beams having different wavelengths; and a lens-supporting mechanism for controlling a position of the objective lens in a radial direction of the optical discs and along an optical axis, wherein the lens-supporting mechanism has a lens-inclination adjusting mechanism capable of changing an angle at which the objective lens is inclined to the optical axis, substantially in proportion to a displacement of the optical disc of the first type, and the second light source section for recording or reproducing data signals on or from the optical disc of the second type is positioned with respect to the position of the first light source section for recording or reproducing data signals on or from the optical disc of the first type, so as to satisfy the following condition:

$120°\leq\theta\leq240°$ where θ is an angle measured counterclockwise from the first light source section used to record or reproduce data signals on or from the optical disc of the first type to the second light source section used to record or reproduce data signals on or from the optical disc of the second type, along a straight line in which the optical pickup moves toward an outer circumference of the optical disc to record or reproduce data signals on or form the optical disc, wherein the lens-inclination adjusting mechanism is configured to change the angle at which the objective lens is inclined, to satisfy the following condition:

$$1/4 \cdot \delta/R \leq S \leq \delta/R$$

where S is the inclination angle of the objective lens, δ is the displacement of the objective lens from a reference position, and R is the radius of the optical disc.

2. The optical pickup according to claim 1, wherein the two light source sections are supported on the same support member.

3. The optical pickup according to claim 1, further comprising a light-receiving section for receiving laser beams reflected by the optical discs, and means arranged between the light-receiving section and the objective lens, for combining optical paths of two types of laser beams emitted from the two light sources, respectively, such that the two laser beams reflected by the optical discs are received at substantially the same point on the light-receiving section.

4. An optical pickup designed to record or reproduce data signals on or from two types of optical discs that differ in at least data recording density and thickness, by using the same objective lens, said optical pickup comprising:

two light source sections for emitting laser beams having different wavelengths; and a lens-supporting mechanism for controlling a position of the objective lens in a radial direction of the optical discs and along an optical axis, wherein the lens-supporting mechanism has a lens-inclination adjusting mechanism capable of changing an angle at which the objective lens is inclined to the optical axis, substantially in proportion to a displacement of the optical disc of the first type, and the second light source section for recording or reproducing data signals on or from the optical disc of the second type is positioned with respect to the position of the first light source section for recording or reproducing data signals on or from the optical disc of the first type, so as to satisfy the following condition:

$$120° \leq \theta \leq 240°$$

where θ is an angle measured counterclockwise from the first light source section used to record or reproduce data signals on or from the optical disc of the first type to the second light source section used to record or reproduce data signals on or from the optical disc of the second type, along a straight line in which the optical pickup moves toward an outer circumference of the optical disc to record or reproduce data signals on or form the optical disc, wherein the optical pickup satisfies the following conditions:

$$-0.3 \leq T \cdot \Delta WD \cdot \varnothing + \tan^{-1}(\Delta L \cdot |\beta|/f) \cdot \cos\theta \leq 0.3$$

$$-0.2 \leq \tan^{-1}(\Delta L \cdot |\beta|/f) \cdot \alpha \cdot \sin\theta \leq 0.2$$

where f is the focal distance of the objective lens; β is the magnification of the optical system; ΔWD is the difference between the working distance of recording or reproducing data signals on or from the optical disc of the first type and the working distance of recording or reproducing data signals on or from the optical disc of the second type; Ø is the angle at which the optical disc of the second type is inclined to record or reproduce the signals in optimal conditions when the incidence angle of the laser beam applied to the objective lens changes by one degree; α is the angle at which the optical disc of the second type is inclined to optimize the signals recorded or reproduced, when the incidence angle of the laser beam applied to the objective lens changes by the one degree (regarded as positive if the disc is inclined to eliminate the influence of inclination of the laser beam); T is the proportionality constant determined by the radius of the optical disc of the first type, which relates the displacement of the objective lens (regarded as positive if the objective lens approaches the optical disc of the first type) from a reference position and the inclination of the objective lens (regarded as positive if the side of the objective lens located at the outer circumference of the optical disc of the first type approaches the optical disc of the first type); ΔL is the distance between the first light source section used to record or reproduce data signals on or from the optical disc of the first type and the second light source section used to record or reproduce data signals on or from the optical disc of the second type; and θ is an angle measured counterclockwise from the first light source section to the second light source section, along a straight line in which the optical pickup moves toward an outer circumference of the optical disc to record or reproduce data signals on or from the optical disc.

5. An optical disc drive apparatus designed to record or reproduce data signals on or from two types of optical discs that differ in specifications such as data recording density, thickness and the like, by using the same objective lens, said optical disc drive comprising:

an optical pickup comprising two light source sections for emitting laser beams having different wavelengths, and a lens-supporting mechanism for controlling a position of the objective lens in a radial direction of the optical discs and along an optical axis, wherein the lens-supporting mechanism has a lens-inclination adjusting mechanism capable of changing an angle at which the objective lens is inclined to the optical axis, substantially in proportion to a displacement of the optical disc of the first type from a reference point in a signal-recording plane of the optical disc of the first type, and the second light source section for recording or reproducing data signals on or from the optical disc of the second type is positioned with respect to the position of the first light source section for recording or reproducing data signals on or from the optical disc of the first type, so as to satisfy the following condition:

$$120° \leq \theta \leq 240°$$

where θ is an angle measured counterclockwise from the first light source section used to record or reproduce data signals on or from the optical disc of the first type to the second light source section used to record or reproduce data signals on or from the optical disc of the second type, along a straight line in which the optical pickup moves toward an outer circumference of the optical disc to record or reproduce data signals on or from the optical disc, wherein the lens-inclination adjusting mechanism is configured to change the angle at which the objective lens is inclined, to satisfy the following condition:

$$1/4 \cdot \delta/R \leq S \leq \delta/R$$

where S is the inclination angle of the objective lens, δ is the displacement of the objective lens from a reference position, and R is the radius of the optical disc.

6. The optical disc drive apparatus according to claim 5, wherein the two light source sections are supported on the same support member.

7. The optical disc drive according to claim 5, further comprising a light-receiving section for receiving laser beams reflected by the optical discs, and means arranged between the light-receiving section and the objective lens, for combining optical paths of two types of laser beams emitted from the two light sources, respectively, such that the two laser beams reflected by the optical discs are received at substantially the same point on the light-receiving section.

8. An optical disc drive apparatus designed to record or reproduce data signals on or from two types of optical discs that differ in specifications such as data recording density, thickness and the like, by using the same objective lens, said optical disc drive comprising:
   an optical pickup comprising two light source sections for emitting laser beams having different wavelengths, and a lens-supporting mechanism for controlling a position of the objective lens in a radial direction of the optical discs and along an optical axis,
   wherein the lens-supporting mechanism has a lens-inclination adjusting mechanism capable of changing an angle at which the objective lens is inclined to the optical axis, substantially in proportion to a displacement of the optical disc of the first type from a reference point in a signal-recording plane of the optical disc of the first type, and
   the second light source section for recording or reproducing data signals on or from the optical disc of the second type is positioned with respect to the position of the first light source section for recording or reproducing data signals on or from the optical disc of the first type, so as to satisfy the following condition:

$$120° \leq \theta \leq 240°$$

where θ is an angle measured counterclockwise from the first light source section used to record or reproduce data signals on or from the optical disc of the first type to the second light source section used to record or reproduce data signals on or from the optical disc of the second type, along a straight line in which the optical pickup moves toward an outer circumference of the optical disc to record or reproduce data signals on or from the optical disc, which satisfies the following conditions:

$$-0.3 \leq T \cdot \Delta WD \cdot \varnothing + \tan^{-1}(\Delta L \cdot |\beta|/f) \cdot \cos\theta \leq 0.3$$

$$-0.2 \leq \tan^{-1}(\Delta L \cdot |\beta|/f) \cdot \alpha \cdot \sin\theta \leq 0.2$$

where f is the focal distance of the objective lens; β is the magnification of the optical system; ΔWD is the difference between the working distance of recording or reproducing data signals on or from the optical disc of the first type and the working distance of recording or reproducing data signals on or from the optical disc of the second type; Ø is the angle at which the optical disc of the second type is inclined to record or reproduce the signals in optimal conditions when the incidence angle of the laser beam applied to the objective lens changes by one degree; α is the angle at which the optical disc of the second type is inclined to optimize the signals recorded or reproduced, when the incidence angle of the laser beam applied to the objective lens changes by the one degree (regarded as positive if the disc is inclined to eliminate the influence of inclination of the laser beam); T is the proportionality constant determined by the radius of the optical disc of the first type, which relates the displacement of the objective lens (regarded as positive if the objective lens approaches the optical disc of the first type) from a reference position and the inclination of the objective lens (regarded as positive if the side of the objective lens located at the outer circumference of the optical disc of the first type approaches the optical disc of the first type); ΔL is the distance between the first light source section used to record or reproduce data signals on or from the optical disc of the first type and the second light source section used to record or reproduce data signals on or from the optical disc of the second type; and 0 is an angle measured counterclockwise from the first light source section to the second light source section, along a straight line in which the optical pickup moves toward an outer circumference of the optical disc to record or reproduce data signals on or from the optical disc.

9. An optical pickup comprising:
   two light source sections for emitting laser beams having different wavelengths;
   a lens-supporting mechanism for controlling a position of the objective lens in a radial direction of the optical discs and along an optical axis,
   wherein the lens-supporting mechanism has a lens-inclination adjusting mechanism capable of changing an angle at which the objective lens is inclined to the optical axis, substantially in proportion to a displacement of the optical disc of the first type from a reference point in a signal-recording plane of the optical disc of the first type, and
   the lens-inclination adjusting mechanism is configured to change the angle at which the objective lens is inclined, to satisfy the following condition:

$$1/4 \cdot \delta/R \leq S \leq \delta/R$$

where s is the inclination angle of the objective lens (regarded as positive if the objective lens approaches the outer circumference of the optical disc), δ is the displacement of the objective lens from a reference position (regarded as positive if the objective lens approaches the optical disc), and r is the radius of the optical disc.

* * * * *

UNITED STATES PATENT AND TRADEMARK OFFICE
CERTIFICATE OF CORRECTION

| | | |
|---|---|---|
| PATENT NO. | : 7,301,872 B2 | Page 1 of 1 |
| APPLICATION NO. | : 10/481825 | |
| DATED | : November 27, 2007 | |
| INVENTOR(S) | : Satoshi Imai | |

It is certified that error appears in the above-identified patent and that said Letters Patent is hereby corrected as shown below:

On the Title page, Item (54) and Col. 1, lines 1-2, Title should read:

-- OPTICAL PICKUP AND OPTICAL DISC DRIVE --

Column 15, Lines 60 and 61 should read:

$$-0.3 \geq T \cdot \Delta WD \cdot \varnothing + \tan^{-1}(\Delta L \cdot |\beta|/f) \cdot \alpha \cdot \cos\theta \leq 0.3$$
$$-0.2 \leq \tan^{-1}(\Delta L \cdot |\beta|/f) \cdot \alpha \cdot \sin\theta \leq 0.2$$

Column 18, Line 29 should read:

-- and $\theta$ is an angle measured counterclockwise --

Signed and Sealed this

Twenty-eighth Day of February, 2012

David J. Kappos
*Director of the United States Patent and Trademark Office*